(12) United States Patent
Bath et al.

(10) Patent No.: US 10,083,190 B2
(45) Date of Patent: *Sep. 25, 2018

(54) ADAPTIVE MONITORING AND PROCESSING OF NEW DATA FILES AND CHANGES TO EXISTING DATA FILES

(71) Applicant: Splunk Inc., San Francisco, CA (US)

(72) Inventors: Amritpal Singh Bath, El Sobrante, CA (US); Mitchell Neuman Blank, San Francisco, CA (US); Vishal Patel, San Francisco, CA (US); Stephen Phillip Sorkin, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 867 days.

This patent is subject to a terminal disclaimer.

(21) Appl. No.: 14/014,059

(22) Filed: Aug. 29, 2013

(65) Prior Publication Data

US 2014/0136488 A1 May 15, 2014

Related U.S. Application Data

(63) Continuation of application No. 13/076,263, filed on Mar. 30, 2011, now Pat. No. 8,548,961.

(51) Int. Cl.
   *G06F 17/30* (2006.01)
(52) U.S. Cl.
   CPC .. *G06F 17/30289* (2013.01); *G06F 17/30144* (2013.01)
(58) Field of Classification Search
   None
   See application file for complete search history.

(56) References Cited

U.S. PATENT DOCUMENTS 5,778,395 A * 7/1998 Whiting ............. G06F 11/1464
5,898,836 A    4/1999 Freivald et al.
(Continued)

FOREIGN PATENT DOCUMENTS

WO    2012/135516 A2    10/2012
WO    2012/135518 A2    10/2012

OTHER PUBLICATIONS

U.S. Appl. No. 14/034,220, Non-Final Office Action dated Sep. 19, 2014.
(Continued)

*Primary Examiner* — Mark D Featherstone
*Assistant Examiner* — Navneet Gmahl
(74) *Attorney, Agent, or Firm* — Wong & Rees LLP; Kirk D. Wong

(57) ABSTRACT

Embodiments are directed towards a dynamic change evaluation mechanism, whereby items having a detected possible change are scheduled for re-evaluation for possible changes at a higher frequency than items detected to not have previously changed, while those items detected as not to have changed are dynamically scheduled for re-evaluation based on an evaluation backlog that may be in turn based, in part, on a time from when an item is assigned an expiration time to when the item is evaluated. In one embodiment, a possibly changed item may be assigned a new expiration time independent of the evaluation backlog. In another embodiment, if no change is detected, then the item may be assigned a new expiration time as a function of a previous expiration time and on the evaluation backlog.

21 Claims, 15 Drawing Sheets

(56) References Cited

U.S. PATENT DOCUMENTS

| | | | |
|---|---|---|---|
| 5,902,352 A | 5/1999 | Chou et al. | |
| 5,918,013 A | 6/1999 | Mighdoll et al. | |
| 6,256,712 B1* | 7/2001 | Challenger | G06F 17/30902 707/999.103 |
| 6,311,197 B2 | 10/2001 | Mighdoll et al. | |
| 7,203,711 B2 | 4/2007 | Borden et al. | |
| 7,320,007 B1 | 1/2008 | Chang | |
| 7,320,009 B1 | 1/2008 | Srivastava et al. | |
| 7,328,217 B2 | 2/2008 | Borthakur et al. | |
| 7,779,021 B1 | 8/2010 | Smith et al. | |
| 7,814,134 B2 | 10/2010 | Leonardos | |
| 7,844,580 B2 | 11/2010 | Srivastava et al. | |
| 7,986,298 B1 | 7/2011 | Dulaney et al. | |
| 8,055,613 B1 | 11/2011 | Mu et al. | |
| 8,103,718 B2 | 1/2012 | O'shea et al. | |
| 8,131,691 B1* | 3/2012 | Nagaralu | G06F 17/30091 707/696 |
| 8,306,954 B2 | 11/2012 | Srivastava et al. | |
| 8,326,803 B1 | 12/2012 | Stringham | |
| 8,346,803 B2 | 1/2013 | Chang | |
| 8,443,354 B1 | 5/2013 | Satish et al. | |
| 8,516,050 B1* | 8/2013 | Chapweske | H04N 1/00204 709/204 |
| 8,548,961 B2 | 10/2013 | Bath et al. | |
| 8,555,157 B1* | 10/2013 | Fu | G06F 17/30893 715/201 |
| 8,566,336 B2 | 10/2013 | Bath et al. | |
| 8,768,984 B2 | 7/2014 | Priddle et al. | |
| 8,977,638 B2 | 3/2015 | Bath et al. | |
| 9,020,987 B1 | 4/2015 | Nanda et al. | |
| 9,424,266 B2 | 8/2016 | Perlin et al. | |
| 9,430,488 B2 | 8/2016 | Bath et al. | |
| 9,767,112 B2 | 9/2017 | Bath et al. | |
| 2001/0003823 A1 | 6/2001 | Mighdoll et al. | |
| 2002/0059245 A1* | 5/2002 | Zakharov | G06F 17/30144 |
| 2002/0133325 A1* | 9/2002 | Hoare, II | G06F 17/5009 703/17 |
| 2003/0041093 A1* | 2/2003 | Yamane | G06F 11/0709 709/201 |
| 2003/0187809 A1 | 10/2003 | Suermondt et al. | |
| 2004/0068664 A1 | 4/2004 | Nachenberg et al. | |
| 2004/0105331 A1 | 6/2004 | Kanail | |
| 2004/0210551 A1 | 10/2004 | Jones et al. | |
| 2004/0233286 A1 | 11/2004 | Kawabe et al. | |
| 2005/0114363 A1 | 5/2005 | Borthakur et al. | |
| 2005/0188086 A1* | 8/2005 | Mighdoll | G06F 8/65 709/225 |
| 2005/0273674 A1 | 12/2005 | Shinn et al. | |
| 2006/0009213 A1 | 1/2006 | Sturniolo et al. | |
| 2007/0028303 A1 | 2/2007 | Brennan | |
| 2007/0050777 A1 | 3/2007 | Hutchinson et al. | |
| 2007/0250517 A1* | 10/2007 | Bestgen | G06F 17/30312 |
| 2007/0276823 A1 | 11/2007 | Borden et al. | |
| 2007/0282462 A1 | 12/2007 | Sourov et al. | |
| 2008/0040388 A1 | 2/2008 | Petri et al. | |
| 2008/0077634 A1 | 3/2008 | Quakerbush | |
| 2008/0228574 A1 | 9/2008 | Stewart et al. | |
| 2008/0243936 A1 | 10/2008 | Li et al. | |
| 2009/0171990 A1 | 3/2009 | Jeong et al. | |
| 2009/0192978 A1 | 7/2009 | Hewett et al. | |
| 2009/0327288 A1 | 7/2009 | Naef, III | |
| 2009/0198744 A1 | 8/2009 | Nakamura | |
| 2009/0228533 A1* | 9/2009 | Reddy | G06F 17/30153 |
| 2009/0271412 A1 | 10/2009 | Lacapra et al. | |
| 2010/0030840 A1 | 2/2010 | o'Shea et al. | |
| 2010/0070475 A1* | 3/2010 | Chen | G06F 11/1461 707/640 |
| 2010/0169287 A1* | 7/2010 | Klose | G06F 11/1453 707/692 |
| 2010/0274772 A1 | 10/2010 | Samuel et al. | |
| 2010/0332513 A1* | 12/2010 | Azar | G06F 17/30469 707/769 |
| 2011/0022840 A1 | 1/2011 | Stefan et al. | |
| 2011/0047594 A1 | 2/2011 | Mahaffey et al. | |
| 2011/0145216 A1* | 6/2011 | Subramanya | G06F 17/30144 707/709 |
| 2011/0161327 A1 | 6/2011 | Pawar | |
| 2011/0225177 A1 | 9/2011 | Farber et al. | |
| 2012/0023065 A1 | 1/2012 | DeWeese et al. | |
| 2012/0059799 A1 | 3/2012 | Oliveira et al. | |
| 2012/0124014 A1 | 5/2012 | Provenzano | |
| 2012/0143824 A1 | 6/2012 | Doshi et al. | |
| 2012/0185445 A1 | 7/2012 | Borden et al. | |
| 2012/0246567 A1 | 9/2012 | Brahms et al. | |
| 2012/0254128 A1 | 10/2012 | Bath et al. | |
| 2012/0254207 A1 | 10/2012 | Bath et al. | |
| 2013/0060937 A1 | 3/2013 | Bath et al. | |
| 2013/0124472 A1 | 5/2013 | Srivastava et al. | |
| 2014/0025655 A1 | 1/2014 | Bath et al. | |
| 2015/0154217 A1 | 6/2015 | Bath et al. | |
| 2016/0335284 A1 | 11/2016 | Bath et al. | |
| 2017/0344576 A1 | 11/2017 | Bath et al. | |

OTHER PUBLICATIONS

U.S. Appl. No. 14/034,220, Final Office Action dated Nov. 14, 2014.

U.S. Appl. No. 14/034,220, Advisory Action dated Dec. 29, 2014.

U.S. Appl. No. 14/034,220, Notice of Allowance dated Jan. 7, 2015.

U.S. Appl. No. 14/611,156, Non-Final Office Action dated Jan. 14, 2016.

U.S. Appl. No. 14/611,156, Notice of Allowance dated Apr. 29, 2016.

"Simple file verification," Wikipedia.org, 2 pages http://en.wikipedia.org/wiki/Simple_file_verificaiton, accessed Mar. 31, 2011.

Coreutils—GNU core utilities, gnu.org, 3 pages http://www.gnu.org/software/coreutils, accessed Mar. 31, 2011.

"UNIX man pages : tail ()" unixhelp.ed.ac.uk, 3 pages http://unixhelp.ed.ac.uk/CGI/man-cgi?tail, accessed Mar. 31, 2011.

"MultiTail," vanheusden.com, 2 pages http://www.vanheusden.com/multitail, accessed Mar. 31, 2011.

"SGI—Developer Central Open Source | FAM," sgi.com, 7 pages http://oss.sgi.com/projects/fam/faq.html, accessed Mar. 31, 2011.

McCallum, E., "The Watchful Eye of FAM" O'Reilly Medial, Inc., Dec. 16, 2004, 7 pages http://linuxdevcenter.com/pub/a/linux/2004/12/16/fam.html, accessed Mar. 31, 2011.

Veillard, D., "Gamin the File Alteration Monitor—Overview," 2 pages http://people.gnome.org/~veillard/gamin/overview.html, accessed Mar. 31, 2011.

"Tripwire IT Compliance Automation Makes IT Security and Compliance Easy," Tripwire, Inc., 2 pages http://www.tripwire.com/it-compliance-products, accessed Apr. 1, 2011.

"Tripwire Enterprise Delivers IT Compliance and Data Protection," Tripwire, Inc., 2 pages http://www.tripwire.com/it-compliance-products/te, accessed Mar. 31, 2011.

"Tripwire Log & Event Management for Next Generation SIEM," Tripwire, Inc. 1 page http://www.tripwire.com/it-compliance-products/log-event-management, accessed Mar. 31, 2011.

"Tripwire Services Shortens the Path to IT Security and Compliance," Tripwire, Inc., 2 pages http://www.tripwire.com/services, accessed Apr. 1, 2011.

"Tripwire Essential Customer Service Offerings," Tripwire, Inc., 2 pages http://www.tripwire.com/services/essential, accessed Apr. 1, 2011.

"Tripwire Advanced Customer Service Offerings," Tripwire, Inc., 2 pages http://www.tripwire.com/services/advanced, accessed Apr. 1, 2011.

Brakmo, L. et al., "TCP Vegas: End to End Congestion Avoidance on a Global Internet," IEEE Journal on Selected Areas in Communications, vol. 13, No. 8, Oct. 1995, pp. 1465-1480.

Floyd, S., "Limited Slow-Start for TCP with Large Congestion Windows," Network Working Groups RFC 3742, The Internet Society, Mar. 2004, 7 pages http://www.rfc-editor.org/rfc/rfc3742.txt, accessed Apr. 1, 2011.

Floyd, S. et al., "The NewReno Modification to TCP's Fast Recovery Algorithm," Network Working Groups RFC 3782, The Internet Society, Apr. 2004, 18 pages http://www.rfc-editor.org/rfc/rfc3782.txt, accessed Apr. 1, 2011.

(56) References Cited

OTHER PUBLICATIONS

Allman, M, et al. "TCP Congestion Control," Network Working Groups RFC 2581, The Internet Society, Apr. 1999, 14 pages http://www.rfc-editor.org/rfc/rfc2581.txt, accessed Apr. 1, 2011.
"Cryptographic has function," Wikipedia.org, 8 pages http://en.wikipedia.org/wiki/Cryptographic_hash_function, accessed Apr. 4, 2011.
International Search Report and Written Opinion for PCT Application No. PCT/US2012031242, dated Oct. 30, 2012, 8 pages.
International Search Report and Written Opinion for PCT Application No. PCT/US2012031246 dated Oct. 30, 2013 8 pages.
International Preliminary Report on Patentability for PCT Application No. PCT/US2012/031242, dated Oct. 1, 2013, 4 pages.
International Preliminary Report on Patentability for PCT Application No. PCT/US2012/031246, dated Oct. 1, 2013, 4 pages.
Non-Final Office Action dated Jul. 19, 2012 for U.S. Appl. No. 13/076,296 14 pages.
Final Office Action dated Jan. 3, 2013, 2013 for U.S. Appl. No. 13/076,296, 16 pages.
Notice of Allowance dated Jul. 5, 2013, 2013 for U.S. Appl. No. 13/076,296, 6 pages.
Non-Final Office Action dated Dec. 5, 2012 for U.S. Appl. No. 13/076,263 15 pages.
Notice of Allowance dated Jun. 11, 2013 for U.S. Appl. No. 13/076,263 21 pages.
Non-Final Office Action dated Feb. 26, 2013 for U.S. Appl. No. 13/662,315, 17 pages.
Final Office Action dated Aug. 30, 2013 for U.S. Appl. No. 13/662,315, 18 pages.
U.S. Appl. No. 15/224,649, Notice of Allowance dated Jun. 14, 2017.

\* cited by examiner

ADAPTIVE MONITORING AND PROCESSING OF NEW DATA FILES AND CHANGES TO EXISTING DATA FILES

TECHNICAL FIELD

The present invention relates generally to monitoring files and other items from various computing systems and, more particularly, but not exclusively to determining how often to schedule an item for evaluation for a possible change to the item based on whether the item possibly changed and further based on a backlog of other items for evaluation that may have delayed evaluation of the item.

BACKGROUND

Today, many companies perform business-related activities on computer systems, networks, or the like, which can range from a single computer for a small company to a hierarchy of servers and a plurality of user computer nodes for a large corporation. Business-related activities create the backbone of a company's information technology (IT) operation, and can include almost any computer use, from sending and receiving emails, to creating and storing documents, hosting web sites, facilitating online transactions, or the like. Therefore, any system errors or failures that are not quickly detected and resolved can percolate throughout the system and can cause great financial hardship to a company. Thus, it is desirable that troubleshooting system errors be fast and efficient. Similarly, a company may want to monitor the performance of its computer systems and networks to prevent errors from occurring, as well as to look for inefficiencies in its system for improvement.

Troubleshooting errors and monitoring system performance generally involves analyzing large amounts of data. As noted above, the financial hardship caused by a system error can sometimes increase as the time to detect and resolve the error increases. Thus, it may be beneficial to monitor data for changes at or near real time to minimize any impacts caused by an error. However, near real time monitoring can be difficult, especially as the amount of data increases. Generally, the more data to be monitored, the longer it may take to check all of the data. In some instances, latency between checks may exponentially increase with an increase in the amount of data that is being monitored. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
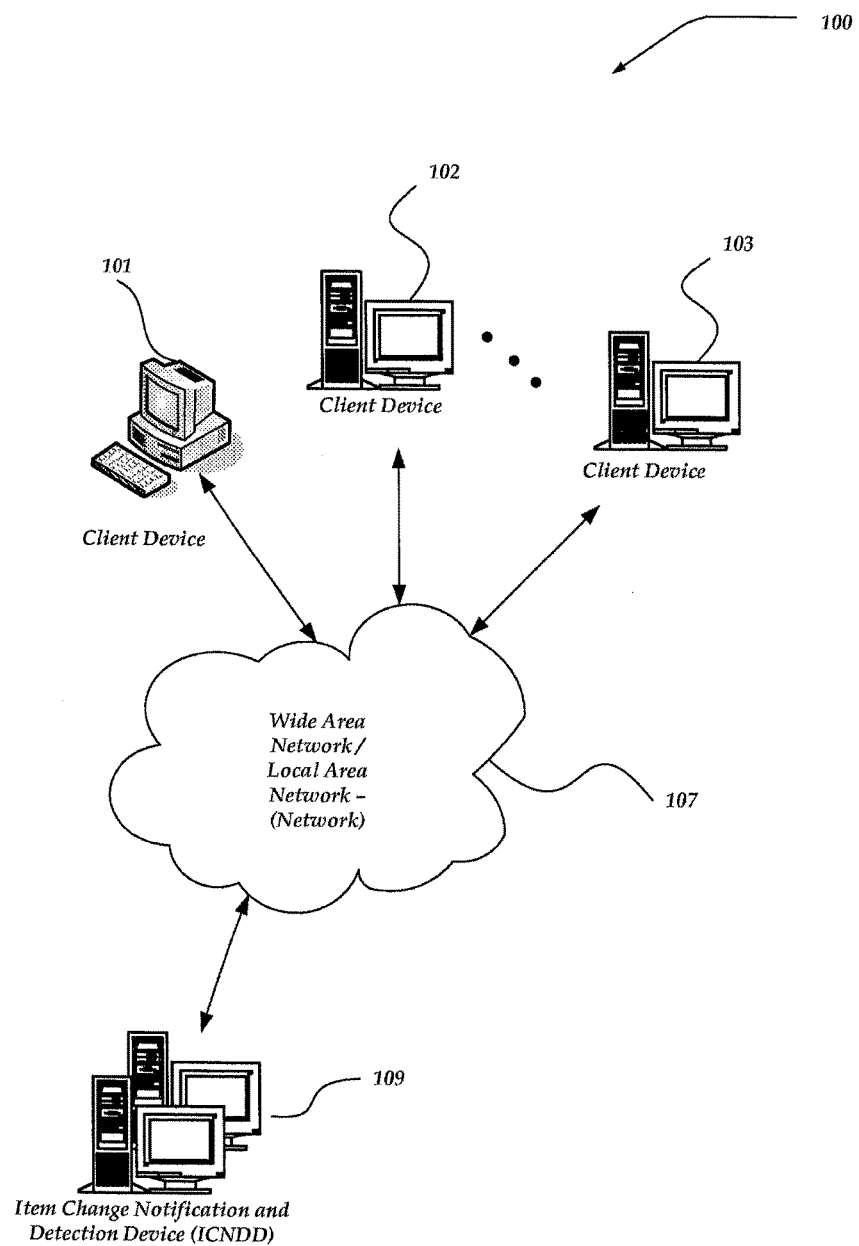
FIG. 1 is a system diagram of an environment in which embodiments of the invention may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "file" refers to a named collection of related data that appears to a user as a single, contiguous block of information and that is retained in computer storage. A directory is a special type of file that may contain a list of file names and/or directory names and a corresponding data structure for each file and directory that it appears to contain.

As used herein, the term "item" refers to a structured collection of related data produced by a computing system.

Such items include, for example, a file, a directory, a socket, queue, or the like. Other collections of related data may also be identified to be an item produced by a computing system, and thus, the above should be construed to be a non-limiting, non-exhaustive example of items that may be considered. In some embodiments, an item may have a beginning of the item and an end of the item. The beginning of the item may refer to a first byte of data that is logically read from the item and the end of the item may refer to a last byte of data that is logically read from the item.

Items may be considered to have or to reside within a state or condition, such as those described in more detail below. In one embodiment, an item is considered to be in one state at a time. Thus, indications that an item is identified in a given state, implies that the item is not in another state. Thus, states may, in one embodiment, be mutually exclusive.

In some embodiments, a tag, flag, pointer, or other identifier may be associated with the item indicating the state in which the item may be considered to reside. In other embodiments, a queue, list, or other structure may be used to manage items in a given state. For example, in one embodiment, as an item is identified in a particular state, the item may be considered to be moved onto a queue, list, or other structure associated with that state. In one embodiment, a tag, identifier, flag, or the like, associated with the item may be moved to the queue, or structure, rather than the item itself. In one embodiment, such structure might be organized as a First In/First Out (FIFO) structure. However, other structures may also be employed. In still another embodiment, a tag, identifier, flag, or the like, may be modified to identify a change in a state of an associated item.

As used herein, the phrase "TIMEOUT state" refers to a condition of an item, where the item is identified to be waiting to be scheduled for evaluation for a possible change. In some embodiments, as noted above, items and/or a related identifier for the items in the TIMEOUT state may reside on (or within) a queue of items, with each item in the queue being in the TIMEOUT state. In one embodiment, a tag, pointer, data field, or other information may indicate an expiration time associated with the item indicating when the item has 'timed-out,' and is therefore available for a possible state change.

As used herein, the phrase "STAT state" refers to a condition of an item, where the item is identified to be waiting to be evaluated for a possible change to the item. In one embodiment, items may be in a defined order or sequence in the STAT state. In some embodiments, items in the STAT state may be considered to reside within a STAT queue of items. In one embodiment, the STAT state (or queue) may be a first-in, first-out (FIFO) queue. However, as noted above for the TIMEOUT state, other structures, and configurations are also envisaged.

As used herein, the phrase "NOTIFY state" refers to a condition of an item, where the item is identified to be waiting to be processed, such as, but not limited to, determining if the item is a new or existing item and processing a change in the item. In some embodiments, items considered to be in the NOTIFY state may be considered to reside on or within a NOTIFY queue of items, each item in the queue being within the NOTIFY state. In one embodiment, the NOTIFY state (or queue) may be a FIFO queue.

As used herein, the phrase "READ_DIR state" refers to a condition of an item that is a directory, where the directory is identified to be waiting to be processed, such as, but not limited to, reading the directory to determine if there is a change to the directory.

As used herein, the phrase "unresolved identifier" refers to one or more identifiers of an item that are identical to corresponding identifiers of another item, such that the item may be indistinguishable from the other item as being a new or existing item.

As used herein, the phrase "NO_ACTION state" refers to a condition of an item, where the item is defined as no longer anticipating a state change, based in part on an unresolved identifier, or the like. As noted, other configurations and representations of item states are also envisaged, and thus, the states of an item are not limited by a particular implementation structure and/or configuration.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards a dynamic change evaluation mechanism, whereby items having a detected possible change are scheduled for re-evaluation for possible changes at a higher frequency than items detected to not have previously changed, while those items detected as not to have changed are dynamically scheduled for re-evaluation based, in part, on a measure of a backlog of other items scheduled for evaluation that may have delayed evaluation of the item. As used herein, the measure of this backlog is referred to as an "evaluation backlog". In one embodiment, a possible change to an item may be detected based on detecting a change to metadata associated with the item, such as a change in a timestamp metadata associated with the item.

In one embodiment, scheduling each item for evaluation for a possible change may be based on an assigned expiration time. The expiration time may be set initially based on a variety of criteria, including based on a time value that is directed towards seeking to re-evaluate changed items for other changes at or near real-time. When the item is evaluated, a new expiration time is assigned to the item based on whether a possible change is detected or not. In one embodiment, if no change is detected, then the item may be assigned a new expiration time as a function of a previous expiration time and on an evaluation backlog that represents a backlog of items that may have delayed evaluation of the item. In one embodiment, the evaluation backlog may be based, in part, on a time from when an item is assigned an expiration time to when the item is evaluated for a possible change. In some embodiments, the new expiration time may be greater or less than the previous expiration time depending on the evaluation backlog. In another embodiment, if a possible change is detected, then the item may be further processed before it is scheduled for re-evaluation. In one embodiment, the possibly changed item may be assigned a new expiration time that is independent of the evaluation backlog. For example, in one embodiment, an item that is detected to have changed may be assigned a new expiration time that seeks to increase a frequency of re-evaluating the item over evaluating other items that did not change.

As described in more detail below, items may be evaluated to detect a possible change. Possible changes to an item may be based, in one embodiment, on detecting a change to selected metadata associated with the item. For example, in one embodiment, a creation time, item size, or other metadata, might be detected to have changed from when the item was previously evaluated for a possible change. Items identified to have a possible change may be further evaluated to determine if the item actually changed. For example, content of the item might be evaluated to determine whether the content of the item changed. In some instances, the selected metadata may have changed, but the content of the item did not change. In such instances, the item may be identified to have not changed. However, if the content of the item is determined to have changed, in one embodiment, this may be sufficient to indicate that the item is changed. That is, a possible change to an item based on metadata analysis, does not necessarily indicate that the item actually changed, although it might have. Moreover, as described in more detail below, an item may be determined to have changed or have not changed based on further evaluation of various characteristics of the item, including a hash associated with the item, an item size, a name of the item, or the like.

Items that have been determined to have changed may then be employed to troubleshoot and/or monitor the performance of a computing system that is providing the items. In some embodiments, such troubleshooting and monitoring may include detecting and/or resolving system errors, determining opportunities to improve system performance, or the like.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 107, client devices 101-103, and Item Change Notification and Detection Device (ICNDD) 109.

One embodiment of client devices 101-103 is described in more detail below in conjunction with FIG. 2. Generally, however, client devices 101-103 may include virtually any computing device capable of communicating over a network to send and receive information, including items, performing various online activities, offline actions, or the like. In one embodiment, one or more of client devices 101-103 may be configured to operate within a business or other entity to perform a variety of services for the business or other entity. For example, client devices 101-103 may be configured to operate as a web server, an accounting server, a production server, an inventory server, or the like. However, client devices 101-103 are not constrained to these services and may also be employed, for example, as an end-user computing node, in other embodiments. Further, it should be recognized that more or less client devices may be included within a system such as described herein, and embodiments are therefore not constrained by the number or type of client devices employed.

The set of such devices may include devices that typically connect using a wired or wireless communications medium such as personal computers, servers, multiprocessor systems, microprocessor-based or programmable consumer electronics, network PCs, or the like. In one embodiment, at least some of client devices 101-103 may operate over wired and/or wireless network. In some embodiments, client devices 101-103 may include virtually any portable computing device capable of receiving and sending a message over a network, such as network 107.

Client devices 101-103 also may include at least one other client application that is configured to receive and/or send data, including items, between another computing device. The client application may include a capability to provide and/or to receive requests for items, or the like. However, the client application need not be limited to merely providing items, and may also provide other information, and/or provide for a variety of other services, including, for example, monitoring for items within and/or between client devices.

The client application may further provide information that identifies itself, including a type, capability, name, and the like. Such information may be provided in a network packet, or the like, sent between other client devices, ICNDD 109, or other computing devices.

Network 107 is configured to couple network devices with other computing devices, including, ICNDD 109, and client devices 101-103. Network 107 is enabled to employ any form of computer readable media for communicating information from one electronic device to another. Also, network 107 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 107 may be configured to transport information of an Internet Protocol (IP). In essence, network 107 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

In some embodiments, network 107 may be further configurable as a wireless network, which may further employ a plurality of access technologies including 2nd (2G), 3rd (3G), 4th (4G) generation radio access for cellular systems, WLAN, Wireless Router (WR) mesh, and the like. In one non-limiting example, network 107, when configured as a wireless network, may enable a radio connection through a radio network access such as Global System for Mobile communication (GSM), General Packet Radio Services (GPRS), Enhanced Data GSM Environment (EDGE), Wideband Code Division Multiple Access (WCDMA), and the like.

One embodiment of ICNDD 109 is described in more detail below in conjunction with FIG. 3. Briefly, however, ICNDD 109 includes virtually any network device usable to operate to receive and/or analyze items from client devices

101-103. ICNDD 109 may, for example, be configured to perform item update notification and/or item change detection. In one embodiment, an item update notifier may be employed to determine how often to schedule an item for evaluation for a possible change to the item. In one embodiment, an item may be scheduled for re-evaluation based on whether the item possibly changed and further based on an evaluation backlog. In another embodiment, an item change detector may be employed to manage and track item identification for new and existing items. The item update notifier and/or the item change detector may be employed by one or more other applications to track items and/or analyze item identification. ICNDD 109 may employ processes such as described below in conjunction with FIGS. 5-15 to perform at least some of its actions.

Devices that may operate as ICNDD 109 include various network devices, including, but not limited to personal computers, desktop computers, multiprocessor systems, microprocessor-based or programmable consumer electronics, network PCs, server devices, network appliances, and the like.

Although FIG. 1 illustrates ICNDD 109 as a two computing devices, the invention is not so limited. For example, in one embodiment, one or more functions of the ICNDD 109 may be performed on a single network device. Similarly, in another embodiment, one or more functions of the ICNDD 109 may be distributed across one or more distinct network devices. For example, item update notification may be performed on one network device, while item change detection may be perform on a different network device. Moreover, ICNDD 109 is not limited to a particular configuration. Thus, in one embodiment, ICNDD 109 may contain a plurality of network devices to perform item update notification and/or item change detection. Similarly, in another embodiment, ICNDD 109 may contain a plurality of network devices that operate using a master/slave approach, where one of the plurality of network devices of ICNDD 109 operates to manage and/or otherwise coordinate operations of the other network devices. In other embodiments, the ICNDD 109 may operate as a plurality of network devices within a cluster architecture, a peer-to-peer architecture, and/or even within a cloud architecture. Thus, the invention is not to be construed as being limited to a single environment, and other configurations, and architectures are also envisaged.

Illustrative Client Device

Figure 2:
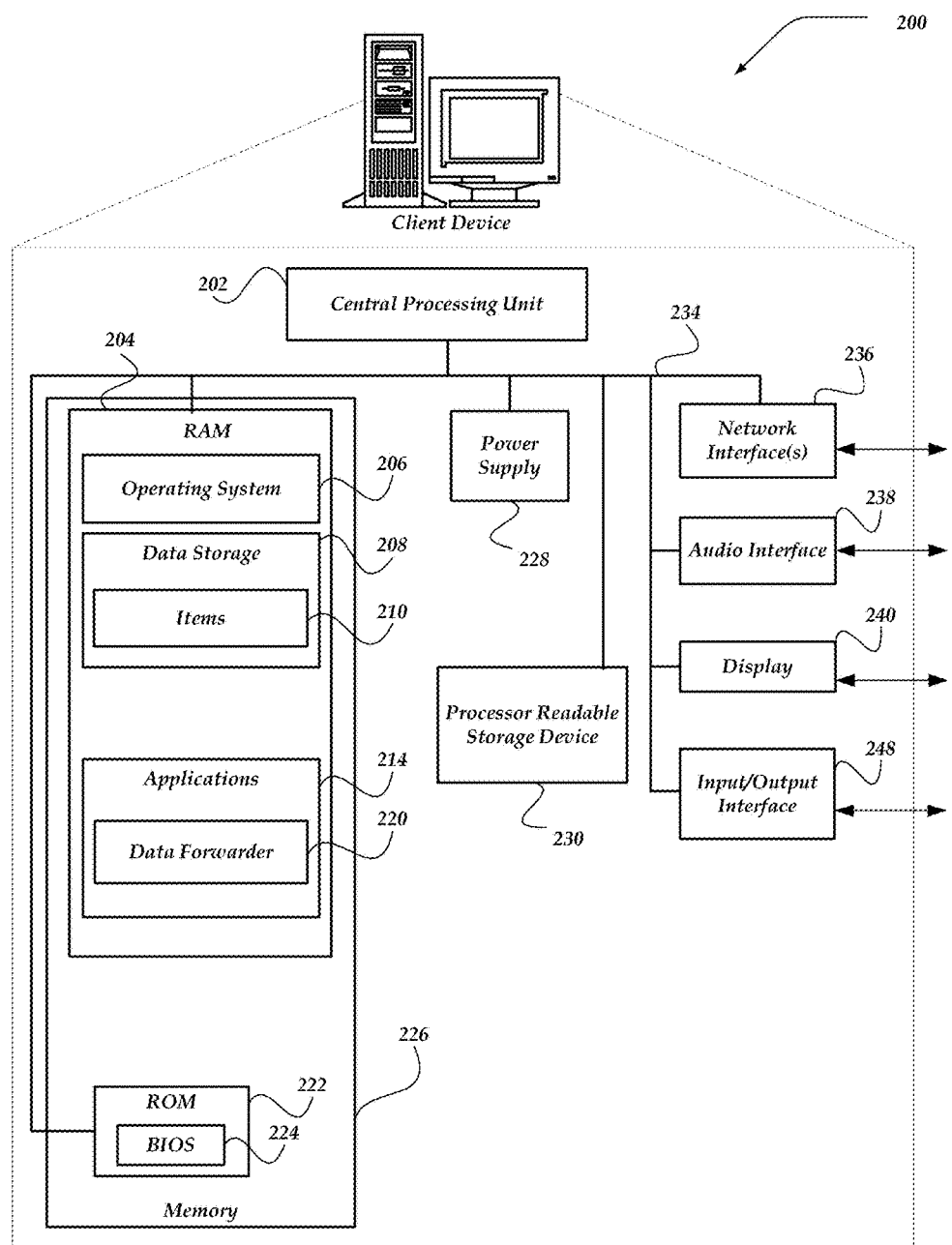
FIG. 2 shows an embodiment of a client device that may be included in a system such as that shown in FIG. 1.

FIG. 2 shows one embodiment of client device 200 that may be included in a system implementing embodiments of the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-103 of FIG. 1.

As shown in the figure, client device 200 includes processing unit (CPU) 202 in communication with a mass memory 226 via a bus 234. Client device 200 also includes a power supply 228, one or more network interfaces 236, an audio interface 238, a display 240, and an input/output interface 248. Power supply 228 provides power to client device 200.

Network interface 236 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (Wi-Max), SIP/RTP, or any of a variety of other communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgment for some action. Display 240 may be a liquid crystal display (LCD), gas plasma, light emitting diode (LED), or any other type of display used with a computing device. Display 240 may also include a touch sensitive screen arranged to receive input from an object such as a stylus or a digit from a human hand.

Client device 200 also comprises input/output interface 248 for communicating with external devices, such as a keyboard, or other input or output devices not shown in FIG. 2. Input/output interface 248 can utilize one or more communication technologies, such as USB, infrared, Bluetooth™, or the like.

Mass memory 226 includes a RAM 204, a ROM 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. At least a portion of the information may also be stored on a disk drive or other computer-readable storage device 230 within client device 200. Data storage 208 may further store items 210. Items 210 may include, for example, files, directories, or the like. Such items 210 may also be stored within any of a variety of other computer-readable storage devices, including, but not limited to a hard drive, a portable storage device, or the like, such as illustrated by computer-readable storage device 230.

Applications 214 may include computer executable instructions which, when executed by client device 200, transmit, receive, and/or otherwise process network data. Other examples of application programs include calendars, search programs, email clients, IM applications, SMS applications, VOIP applications, contact managers, task managers, transcoders, database programs, word processing programs, security applications, spreadsheet programs, games, search programs, data log recording programs, and so forth. Applications 214 may include, for example, data forwarder 220. In some embodiments, ICNDD 109 of FIG. 1 may be configured to provide a downloadable tool, such as data forwarder 220, to client device 200. Data forwarder 220 may be configured to send data, such as items 210, to another network device, such as ICNDD 109 of FIG. 1. Items 210 may be sent to ICNDD 109 based on a request from ICNDD 109, or other network device. However, items 210 may also be sent based on a time, a change in a state of client device 200, or any of a variety of other criteria.

Illustrative Network Device

Figure 3:
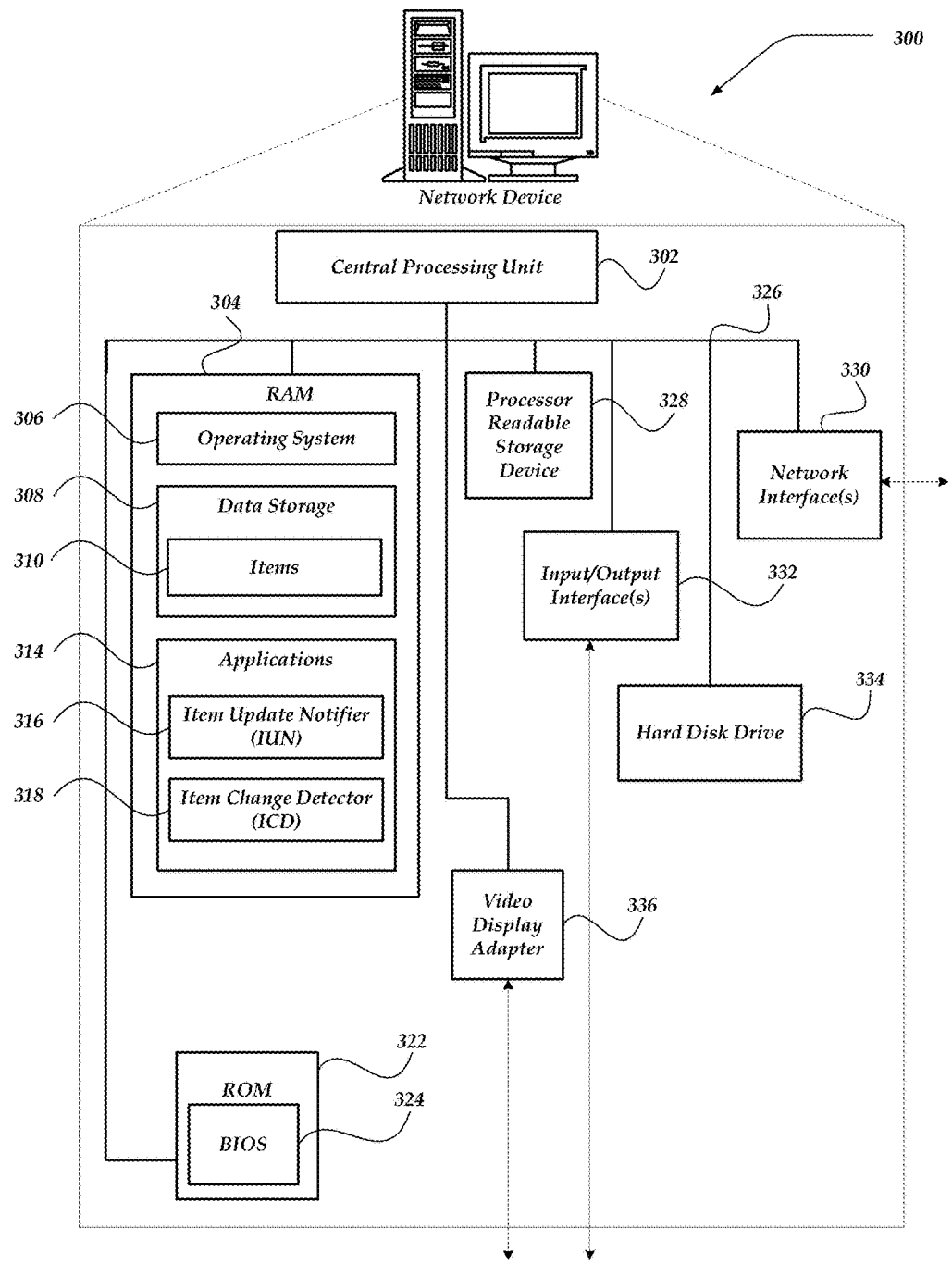
FIG. 3 shows an embodiment of a network device that may be included in a system such as that shown in FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, client, peer, or any other device. Network device 300 may represent, for example ICNDD 109 of FIG. 1.

Network device 300 includes processing unit 302, an input/output interface 332, video display adapter 336, and a mass memory, all in communication with each other via bus 326. The mass memory generally includes RAM 304, ROM 322 and one or more permanent mass storage devices, such as hard disk drive 334, tape drive, optical drive, and/or floppy disk drive. The mass memory stores operating system 306 for controlling the operation of network device 300. Any general-purpose operating system may be employed. Basic input/output system ("BIOS") 324 is also provided for controlling the low-level operation of network device 300. As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

The mass memory as described above illustrates another type of computer-readable media, namely computer-readable storage media and/or processor-readable storage medium. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory physical medium which can be used to store the desired information and which can be accessed by a computing device.

As shown, data storage 308 may include a database, text, spreadsheet, folder, file, or the like, that may be configured to maintain and store user account identifiers, user profiles, email addresses, IM addresses, and/or other network addresses; or the like. Data stores 308 may further include program code, data, algorithms, and the like, for use by a processor, such as central processing unit (CPU) 302 to execute and perform actions. In one embodiment, at least some of data store 308 might also be stored on another component of network device 300, including, but not limited to computer-readable storage device 328, hard disk drive 334, or the like. Data storage 308 may further store items 310. Items 310 may include files, directories, or the like received from another network device, such as client device 200 of FIG. 2. In one embodiment, data storage 308 may further store and/or otherwise manage various queues, flags, pointers, lists, and/or other data structures useable to manage states of items residing within items 310.

The mass memory also stores program code and data. One or more applications 314 are loaded into mass memory and run on operating system 306. Examples of application programs may include transcoders, schedulers, calendars, database programs, word processing programs, HTTP programs, customizable user interface programs, IPSec applications, encryption programs, security programs, SMS message servers, account managers, and so forth. Item Update Notifier (IUN) 316 and Item change Detector (ICD) 318 may also be included as application programs within applications 314.

IUN 316 may include virtually any computing component or components configured and arranged to determine how often to schedule an item for evaluation for a possible change to the item. In one embodiment, IUN 316 may schedule an item for re-evaluation based on whether the item possibly changed and further based on an evaluation backlog. In another embodiment, IUN 316 might determine to re-schedule the item for re-evaluation when it is determined that the item possibly changed, independent of (e.g., without concern for) the evaluation backlog. Scheduling items for re-evaluation may be managed, in one embodiment by assigning an expiration time to the item. In one embodiment, IUN 316 may perform actions such as those described below in conjunction with FIGS. 5-9.

ICD 318 may be configured and arranged to manage and track item identification for new and existing items. In one embodiment, ICD 318 may employ one or more item identifiers for determining if an item is a new or existing item based on a comparison of the one or more item identifiers with an item record associated with at least one of the item identifiers. In one embodiment, ICD 318 may perform actions such as those described below in conjunction with FIGS. 10-15.

General Overview

Figure 4:
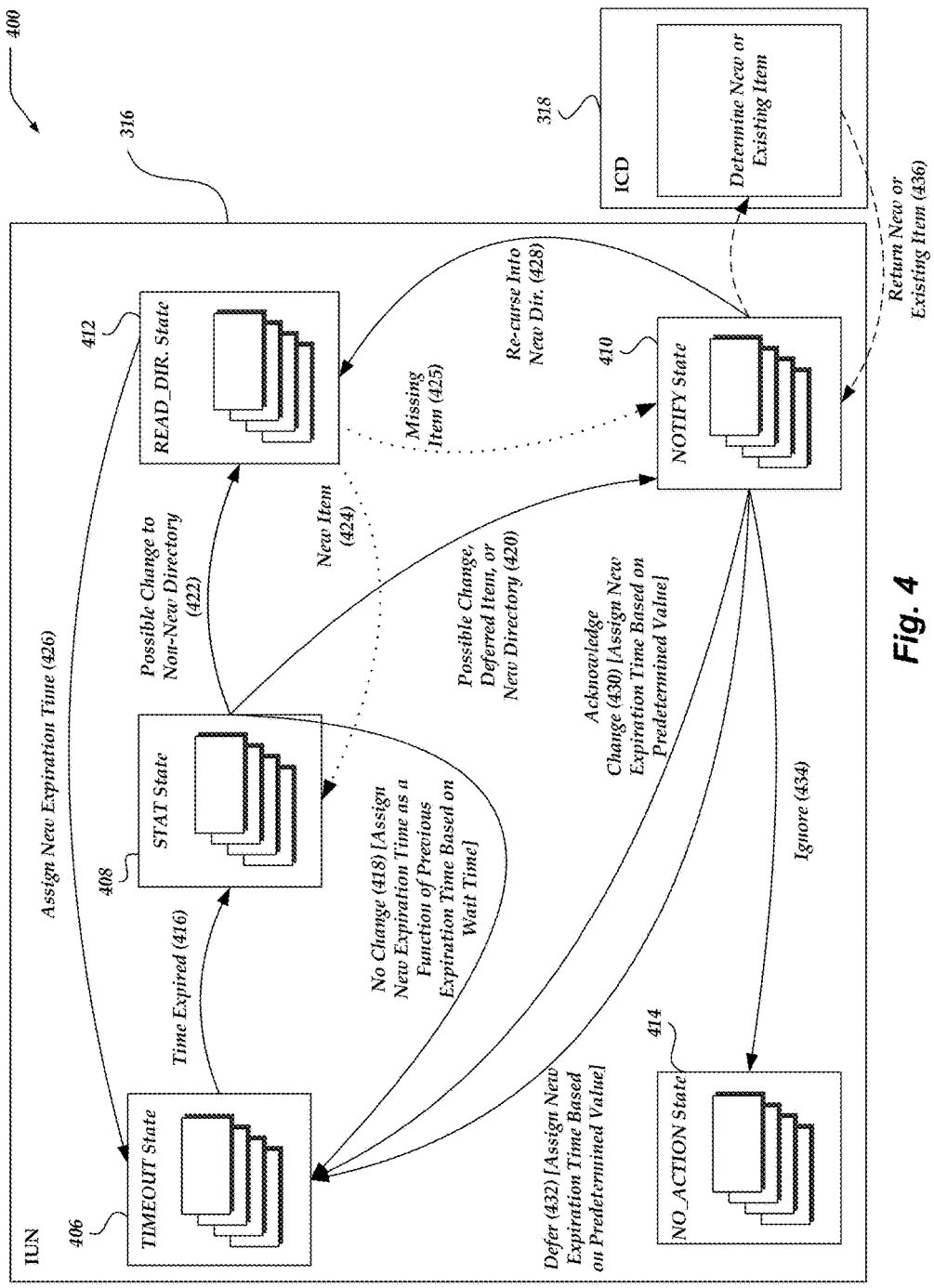
FIG. 4 illustrates a state diagram generally showing one embodiment of a general overview of state changes of an item.

FIG. 4 illustrates a state diagram generally showing one embodiment of a general overview of state changes of an item. State diagram 400 includes Item Update Notifier (IUN) 316 and Item Change Detector (ICD) 318. IUN 316 includes five states in which an item may be associated: TIMEOUT state 406, STAT state 408, NOTIFY state 410, READ_DIR state 412, and NO_ACTION state 414.

An item may be initially identified as being in a TIMEOUT state 406 with an initially assigned expiration time. When the expiration time for the item expires (416), the item may be scheduled for evaluation by changing from TIMEOUT state 406 to STAT state 408. While in STAT state 408, an item is evaluated to detect a possible change. When there is no change detected to the item (418), then the item changes to be in a TIMEOUT state 406, to be scheduled for re-evaluation based on an evaluation backlog and a previous expiration time. In one embodiment, the item may be assigned a new expiration time as a function of the previous expiration time and on the evaluation backlog. When there is a possible change to the item and the item is a non-new directory (422), then the item changes from STAT state 408 to READ_DIR state 412. However, when there is a possible change to the item and the item is not a non-new directory (420), then the item changes from STAT state 408 to NOTIFY state 410.

While in READ_DIR state 412, a non-new directory is processed. In one embodiment, processing the non-new directory may include reading the directory for a change. If a new item is detected (424), then the new item is identified as being in a STAT state 408. If an item is missing (425), then the missing item is identified as being in a NOTIFY state 410. When the processing of an item in READ_DIR state 412 is finished (426), the item (e.g. the non-new directory) changes to be in a TIMEOUT state 406 to be scheduled for re-evaluation independent of an evaluation backlog.

While in NOTIFY state 410, an item is processed by ICD 318 and subsequently processed for a change. ICD 318 may return the item as a new or existing item (436) and in some embodiments an unresolved identifier (e.g. the item is indeterminable as a new or existing item). In some embodiments, ICD 318 may return a defer change acknowledgment command or a change acknowledgment command based on if the new or existing item is complete. If a defer change acknowledgment command is returned, then the item changes to be in a TIMEOUT state 406 to be scheduled for re-evaluation (432). In one embodiment, the item is assigned a new expiration time based on a predetermined value, independent of an evaluation backlog. If a change acknowledgment command is returned, then the item changes to be in a TIMEOUT state 406 to be scheduled for re-evaluation (430). In one embodiment, the item may be assigned a new expiration time based on the predetermined value, independent of the evaluation backlog. If the item is a new directory and is "recursed" into (428), then the item changes from NOTIFY state 410 to READ_DIR state 412. However, if an item is to be ignored (434), such as if an unresolved identifier is returned by ICD 318, then the item changes to be in a NO_ACTION state 414, where the item is anticipated to not change states.

The following further describes, in more detail, the evaluations of items and their state changes and expiration time computations as mentioned above.

General Operation

The operation of certain aspects of the invention will now be described with respect to FIGS. 5-15. In some embodiments, the processes described with respect to FIGS. 5-15 may be implemented by and/or executed on a single network device, such as network device 300 of FIG. 3. In other embodiments, the processes described with respect to FIGS. 5-15 or portions thereof may be implemented by and/or executed on a plurality of network devices, such as network device 300 of FIG. 3.

Figure 5:
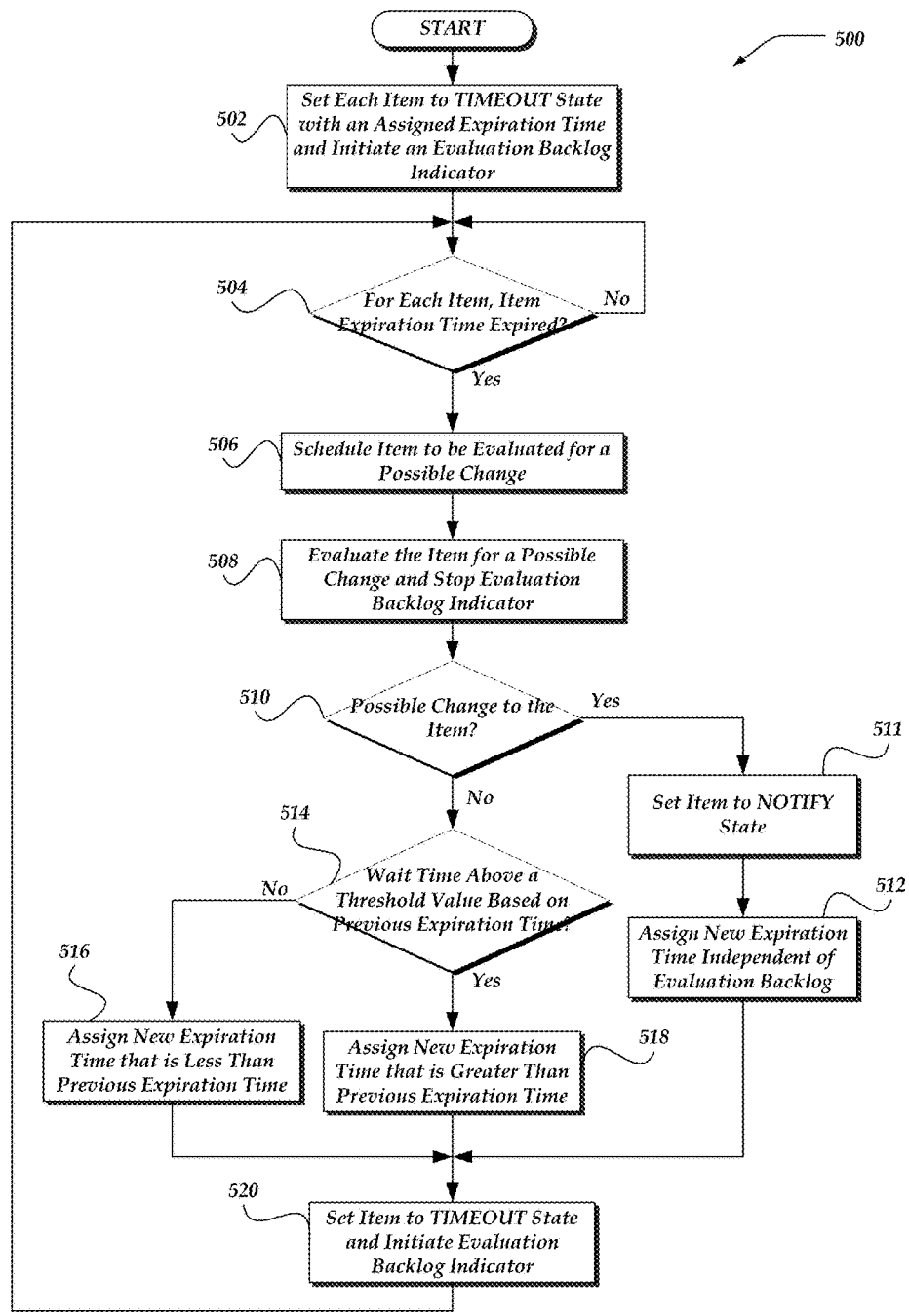
FIG. 5 illustrates a logical flow diagram generally showing one embodiment of an overview process for determining how often to schedule an item for an evaluation for a possible change.

FIG. 5 illustrates a logical flow diagram generally showing one embodiment of an overview process for dynamically scheduling items for evaluation for a possible change. Process 500 of FIG. 5 begins, after a start block, at block 502, where each item of a plurality of items is identified as being in a TIMEOUT state with an assigned expiration time. In some embodiments, the expiration time may be a system time based on a predetermined value. The system time may refer to an internal clock time of a computing system performing operations on the item. In other embodiments, the expiration time may be a decrementing time counter based on a predetermined value. In one embodiment, the predetermined value may be an arbitrary value, based on a total number of items in a plurality of items and/or system performance (e.g. processor speed, available memory, or the like), or the like. For example, in one embodiment, the predetermined value may be based on a time that computed to seek to schedule evaluation of each item initially as quickly as the system performance is determined to allow, such as approximately in real-time, or the like. Further, in some embodiments, the item may include the assigned expiration time in metadata associated with the item. In one non-limiting example, item metadata may include information indicating when the expiration time is set to expire.

Additionally, at block 502, an evaluation backlog indicator is initiated. The evaluation backlog indicator may indicate a backlog of items that are scheduled to be evaluated to detect a possible change. In some embodiments, an indication of the backlog may be based on a time difference (or wait time) between a time when an item is assigned an expiration time to when the item is "at a top of a stack" and therefore is to be evaluated or is otherwise selected for evaluation of a possible change to the item. Therefore, in some embodiments, the wait time may be based on a time when the evaluation backlog indicator is initiated and a time when the evaluation backlog indicator is stopped. In some embodiments, the evaluation backlog indicator may be initiated by storing a current system time. In other embodiments, the evaluation backlog indicator may be initiated by starting an incremental time counter. Although embodiments are described as initiating the backlog indicator when an item is assigned an expiration time, the invention is not so limited; and, in other embodiments, the evaluation backlog indicator may be initiated when the item is scheduled for evaluation, such as at block 506.

Moreover, in some embodiments, the item may include the evaluation backlog indicator for the item in metadata associated with the item. In one non-limiting example, item metadata may include the start time of the evaluation backlog indicator. In any event, it should be recognized that evaluation backlog indicators are assigned to each item, and may be employed to identify a duration for which that item is delayed for evaluation based on a backlog of other items to be evaluated prior to the item.

In some embodiments, when an item is first identified as being in a TIMEOUT state, data corresponding to the item may be stored in a lookup table, file, or other storage mechanism. In one embodiment, such data may include, but is not limited a name of the item, a hash identifier of the item, or other metadata associated with the item.

Process 500 next proceeds to decision block 504, where a determination is made whether an expiration time for an item has expired. As may be seen, process 500 continues from block 502 on a by item basis, each item having its own expiration time associated with it. In one embodiment, an expiration time for an item may expire when a decrementing time counter reaches zero or some other defined value. In another embodiment, an expiration time for an item may expire when the system time is equal to the expiration time. Further, in some embodiments, an expired item may be detected based on the items in the TIMEOUT state being ordered in a heap structure according to their assigned expiration time.

In any event, if an expiration time for an item has expired, then processing for that item flows to block 506; otherwise, processing loops back to decision block 504 to monitor other items for expiration of their times. At block 506, the "expired item" is scheduled to be evaluated for a possible change. In some embodiments, scheduling the item for evaluation may include identifying the item to be in a STAT state. In one embodiment, when the "expired item" is identified in the STAT state, a pointer to the "expired item" may be placed on a FIFO queue to denote the item is in the STAT state. However, other structures, or actions, may also be employed, as discussed elsewhere.

Process 500 continues to block 508, where the item is evaluated for a possible change. In some embodiments, the item is evaluated for a possible change when the item is at an output location on a STAT queue. Moreover, in some embodiments, evaluating the item for a possible change may include checking selected metadata of the item to determine if there is a possible change to the item. In some embodiments, the metadata may include an item size; one or more timestamps, e.g. an access time, a creation time, a modification time, or the like; a permissions attribute; or the like. The item size may refer to a total number of bytes of data that correspond to the item, such as a length of an item in bytes, or some other measure of a count of data may be employed. A change in an item's selected metadata may suggest a possible change to content of the item. In other embodiments, the contents of the item might be analyzed for a possible change.

Additionally, at block 508, the evaluation backlog indicator is stopped. As noted above, an indication of a backlog may be based on a wait time between a time when an item is assigned an expiration time to when the item is "at a top of a stack" and therefore is to be evaluated or is otherwise selected for evaluation of a possible change to the item. Therefore, in some embodiments, the wait time may be based on a time when the evaluation backlog indicator is initiated and a time when the evaluation backlog indicator is stopped. In one embodiment, the evaluation backlog indicator may be stopped by storing a stop time based on a current system time. In another embodiment, the evaluation backlog indicator may be stopped by stopping an incremental time counter that corresponds to the item.

Continuing next to decision block 510, a determination is made whether a possible change to the item is detected. In some embodiments, the item's metadata may include an indication that there is a possible change to the item, such as, for example, a change in a permissions attribute, item size, a modification time, or the like. In one embodiment, the metadata associated with the item may be compared to stored metadata to determine if there is a possible change to the item. In another embodiment, a tag, flag, or other identifier may indicate the item has possibly changed. If there is a possible change to the item based on a detected change to the selected metadata, then processing flows to block 511; otherwise, processing flows to decision block 514.

At block 511, the possibly changed item is identified to be in a NOTIFY state for further processing. In one embodiment, the possibly changed item may be placed on a queue that denotes items in the NOTIFY state. Processing then proceeds to block 512, where, in one embodiment, a new expiration time is assigned to the item independent of the evaluation backlog. In one embodiment, the new expiration time may be based on a predetermined value. Various values may be selected. For example, where it is desired to re-evaluate items that have changed more frequently than items not having changed, then the predetermined value may be set to a selected low value. For example, the predetermined value may be set to a low value between about 0.001 seconds to about 2.0 seconds. However, other low values may also be selected, based on engineering judgment, characteristics of a computing system including processor speed, memory speed, a number of items in a TIMEOUT state, a number of items across a plurality of different state, or the like. In some embodiments, the predetermined value employed to assign a new expiration time may be the same or different than the predetermined value used to initially assign an expiration time, as described at block 502.

In one embodiment, for items with a detected possible change, but not an actual change, the new expiration time may be based on the evaluation backlog indicator for the item. However, in another embodiment, those items that have an actual change detected and not merely a possible change might have their expiration times set independent of the evaluation backlog indicator. Thus, the invention is configured to accommodate either or both conditions. If the item is to have its expiration time based on the evaluation backlog indicator for the item, the process might, in one embodiment, flow to decision block 514. Otherwise, processing continues to block 520.

At decision block 514, a determination is made whether the wait time for the item is above a threshold value that is based on a previous expiration time. As noted above, in one embodiment, the wait time may be based on a time difference between when the evaluation backlog indicator is initiated and a time when the evaluation backlog indicator is stopped.

In one embodiment, the threshold value may be selected as some percentage of the previous expiration time for the item. In one embodiment, the percentage may be selected to minimize dithering or bouncing about a given time value. For example, the threshold value might be selected to be between about 105% to about 120% of the previous expiration time, to provide a tolerance level in the evaluation. However, the invention is not limited to these values, and others may readily be selected based on engineering judgment, historical data, or the like.

As noted above, the threshold value for an item may be a function of the previous expiration time of the item, such that a comparison with the wait time of the item may provide an indication as to an evaluation backlog. An evaluation backlog may occur for a variety of reasons. For example, a backlog may occur when a system is not continuously evaluating items and/or the items are not evaluated at or near real time, even though the items are scheduled for evaluation, e.g. identified to be in a STAT state. Consequently, an increase in the evaluation backlog may be reflected by an increase in the wait time of an item and/or an increase in a difference between the wait time and the expiration time of the item. In any event, if the wait time is above the threshold value, then processing flows to block 518; otherwise processing flows to block 516.

At block 518, if the wait time for an item is above the threshold value for the item, then the system may be overloaded or otherwise behind in processing of items, resulting in an increased evaluation backlog. Thus, the rate at which items that do not have a change (or possible change) may be scheduled for re-evaluation for a possible change at a decreased rate by assigning the item a new expiration time that is greater (or takes longer to expire) than the previous expiration time of the item. In this manner, the item may be "removed" from the STAT state for a longer time duration. This action is directed towards decreasing the number of items in the STAT state, and allowing the system to "catch up."

In some embodiments, the new expiration time may be a multiplicative increase of the previous expiration time or the wait time of the item. In one non-limiting, non-exhaustive example, the increase in expiration time may be double the previous expiration time. However, other values may also be employed. In other embodiments, the new expiration time may be determined based on a constant value that is added to the previous expiration time or wait time of the item. In any case, the new expiration time can be a function of the previous expiration time and/or a function of the wait time of the item. Although certain embodiments are described for assigning a new expiration time, the invention is not so limited; rather, any suitable algorithm to increase the expiration time as a function of the previous expiration time may be employed. For example, in another non-limiting embodiment, the new expiration time may be a difference between the wait time and the previous expiration time that is then added to the wait time of the item.

Furthermore, in one embodiment, if the new expiration time exceeds a maximum expiration time value, then it may be determined that the item will probably not change and the item may be changed to be in a NO_ACTION state. Similarly, in another embodiment, the new expiration time may be limited to a maximum expiration time value, such that the new expiration time does not exceed the maximum expiration time value, but is not identified as being in a NO_ACTION state. In any event, processing then continues to block 520.

At block 516, if the wait time of an item is equal to or less than the threshold value for the item, then the STAT state may be under populated and evaluations may be occurring less quickly than the system might be able to accommodate. Thus, the rate at which items not having a detected change may be scheduled to be re-evaluated at an increased rate by assigning the item a new expiration time that is less (or expires more quickly) than the previous expiration time of the item. Therefore, the rate at which the system evaluates items may increase, which can result in a decrease in the wait time of the items.

In some embodiments, the new expiration time may be some percentage less than the previous expiration time. In one non-limiting, non-exhaustive example, the percentage may be selected to be between about 94%-98% of the previous expiration time. In other embodiments, the new expiration time may be the previous expiration time minus a constant time value, such as one, or 0.1, or some other constant. However, other values may also be selected. Although certain embodiments are described for assigning a new expiration time, the invention is not so limited; rather, any suitable algorithm to decrease the expiration time as a function of the previous expiration time and/or wait time may be employed.

Moreover, in some embodiments, the new expiration time may be limited to a minimum expiration time value. In one embodiment, the minimum expiration time value may be equal to the assigned expiration time at block 502. However, the invention is not so limited, and any suitable minimum expiration time value may be employed. In any event, processing then continues to block 520.

Alternative embodiments of determining threshold values and assigning a new expiration time for an item are described in more detail below in conjunction with FIG. 7.

At block 520, the item is identified to be in a TIMEOUT state to be scheduled for re-evaluation. In one embodiment, the item also is assigned the new expiration time. Additionally, the backlog indicator is initiated for the item. In some embodiments, initiating the evaluation backlog indicator may be employed using embodiments described at block 502. Process 500 then loops back to decision block 504.

Figure 6:
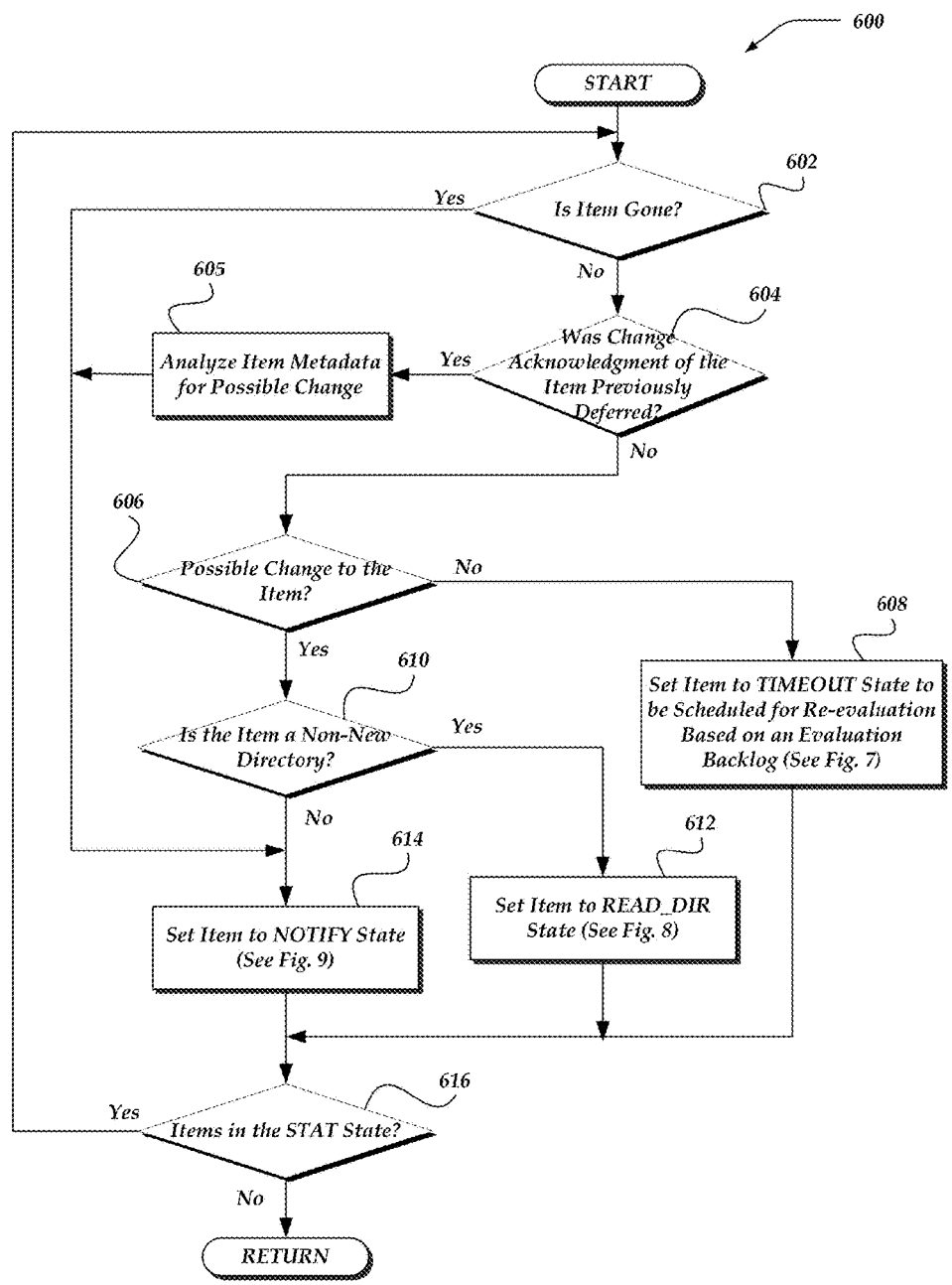
FIG. 6 illustrates a logical flow diagram generally showing one embodiment of a process for evaluating an item for a possible change.

FIG. 6 illustrates a logical flow diagram generally showing one embodiment of an overview process for evaluating items in the STAT state. In some embodiments, items in the STAT state may be managed as a queue of items, such as but not limited to a FIFO queue. Thus, in one embodiment, process 600 of FIG. 6 may be implemented on one item at a time when the item is at an output location on, such as or "at the top" of the queue, or other defined position relative to another item also in the STAT state. However, the invention is not to be construed as limited to implementing the STAT state as a queue; rather, other ordered data structures may be implemented. For example, other embodiments of implementing the STAT state may include an ordered list, a ranking of items, or the like. In one such embodiment, an item with a highest ranking among a plurality of items in the STAT state may be processed before other items in the STAT state.

In any event, process 600 begins, after a start block, at block 602, where a determination is made whether an item is determined to be gone. An item may be determined to be gone if it has been deleted, renamed, moved, or the like, by a user, a computer application, or the like. If the item is not gone, then processing flows to decision block 604; otherwise, processing flows to block 614.

At decision block 604, a determination is made whether a change acknowledgment of the item was previously deferred. In some embodiments, the change acknowledgment may be deferred if the item was processed for a possible change, but processing was not completed, such as, but not limited to, not reading an item to an end of file, or similar item identifier. In some embodiments, the item may include an attribute that identifies if the change acknowledgment was previously deferred. In one embodiment, metadata associated with the item may include a defer change acknowledgment command. If the change acknowledgement of the item was previously deferred, then processing flows to block 605; otherwise, processing flows to decision block 606. At block 605, metadata associated with the item is analyzed for a possible change. Processing then flows to block 614.

At decision block 606, a determination is made whether there is a possible change to the item. In some embodiments, evaluation of metadata associated with the item may indicate that there is a possible change to the item, such as, for example, a change in a timestamp. In one embodiment, the metadata associated with the item may be compared to stored metadata to determine if there is a possible change to the item. In another embodiment, a tag, flag, or other identifier may indicate the item has possibly changed. If there is not a possible change to the item based on the evaluation of at least the metadata, then processing flows to block 608; otherwise, processing flows to decision block 610.

Block 608 is described in more detail below in conjunction with FIG. 7. Briefly, however, at block 608, the item is identified to be in a TIMEOUT state to be scheduled for re-evaluation based on an evaluation backlog. Processing then flows to decision block 616.

At decision block 610, a determination is made whether the item is a non-new directory. In one embodiment, a new directory may refer to an indication of a directory that was generated while an item in the READ_DIR state was being processed and subsequently changes to be in a STAT state. Therefore, a non-new directory may refer to a directory that changed from a TIMEOUT state to a STAT state. In some embodiments, a new directory may be referred to as a non-new directory if the new directory is recursed into (which is shown by element 428 of FIG. 4). If the item is a non-new directory, then processing flows to block 612; otherwise, processing flows to block 614. Block 612 is described in more detail below in conjunction with FIG. 8.

Briefly, however, at block 612, the non-new directory is identified as being in a READ_DIR state, where the non-new directory is processed for a possible change. Processing then flows to decision block 616.

However, if the item is not a non-new directory, e.g. a new directory, an item with a defer change acknowledgement, or other possibly changed item, then processing flows to block 614, which is described in more detail below in conjunction with FIG. 9. Briefly, however, at block 614, the item is identified to be in a NOTIFY state, where the item is processed for a possible change. Processing then continues to decision block 616.

At decision block 616, a determination is made whether there are any items remaining in the STAT state. In one embodiment, items may remain in the STAT state if a STAT state queue is not empty. If there are items remaining in a STAT state, then processing loops to block 604 to process a next item; otherwise, processing returns to a calling process to perform other actions. In some embodiments, the next item may be a next item in a queue. In other embodiments, the next item may be a highest ranking item of the items remaining in the STAT state.

Figure 7:
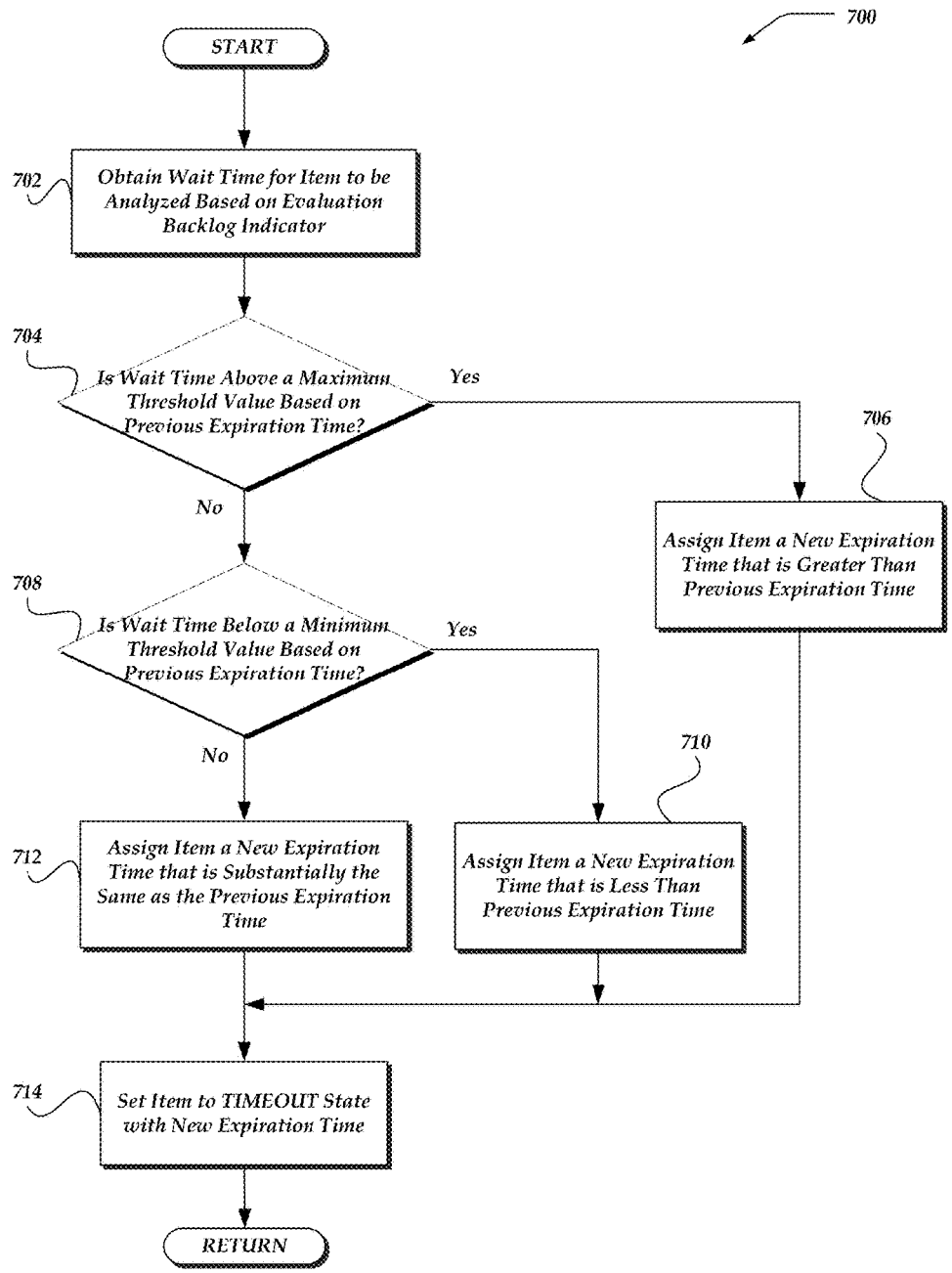
FIG. 7 illustrates a logical flow diagram generally showing one embodiment of a process for dynamically scheduling an item for re-evaluation for a possible change.

FIG. 7 illustrates a logical flow diagram generally showing one embodiment of an overview process for dynamically scheduling an item for re-evaluation for a possible change based on an evaluation backlog. In one embodiment, process 700 of FIG. 7 represents actions taken at block 608 of FIG. 6.

Process 700 begins, after a start block, at block 702, where a wait time for an item to be analyzed is obtained based on an evaluation backlog indicator. In one embodiment, an evaluation backlog indicator start time may be a system time when an item is identified as being in a TIMEOUT state and an evaluation backlog indicator stop time may be a system time when the item was analyzed for a possible change in the STAT state. In other embodiments, the evaluation backlog indicator may be based on an incrementing time counter that is started when an item is identified as being in a TIMEOUT state and stopped when the item was analyzed for a possible change in the STAT state. Moreover, in some embodiments, the wait time may be the difference between the evaluation backlog indicator start time and the evaluation backlog indicator stop time, or the resulting incrementing time counter for the evaluation backlog indicator.

Proceeding to decision block 704, a determination is made whether the wait time is above a maximum threshold value that is based on a previous expiration time of the item. In one embodiment, the maximum threshold value may be similar to that which is described above in conjunction with block 514 of FIG. 5 for determining the threshold value. In any event, if the wait time is above the maximum threshold value, then processing flows to block 706; otherwise, processing flows to decision block 708.

At block 706, the item is assigned a new expiration time that is greater than the previous expiration time. In one embodiment, the new expiration time may be determined similar to that which is described above in conjunction with block 518 of FIG. 5. Processing then continues to block 714.

At decision block 708, a determination is made whether the wait time is below a minimum threshold value based on a previous expiration time of the item. In one embodiment, the minimum threshold value may be determined similar to that which is described above in conjunction with block 514 of FIG. 5 for determining a threshold value. In any event, if the wait time is below the minimum threshold value, then processing flows to block 710; otherwise, processing flows to block 712.

At block 710, a new expiration time is assigned to the item that is less than the previous expiration time, similar to that which is described above in conjunction with block 516 of FIG. 5. Processing then continues to block 714.

At block 712, the item is assigned a new expiration time that is substantially the same as the previous expiration time. In some embodiments, a substantially the same new expiration time may include a new expiration time that is within, plus or minus, some threshold or tolerance time value of the previous expiration time. In one embodiment, the threshold or tolerance time value may be plus or minus one-half second. In another embodiment, the threshold or tolerance time value may be based on a factor of the previous expiration time, such as, for example, plus or minus ten percent of the previous expiration time. These embodiments are not to be construed as exhaustive or limiting; and other tolerance mechanisms may be employed, such as, for example, basing the substantially similar value on a round off error and/or truncation error in the system. Thus, substantially the same provides a selectable tolerance value around the previous expiration time. In any event, process 700 flows to block 714.

At block 714, the item is identified to be in a TIMEOUT state with the new expiration time. Processing then returns to a calling process to perform other actions.

Although FIG. 7 describes two threshold values, a maximum threshold value and a minimum threshold value, the invention is not so limited. Rather, a different number of thresholds may be implemented. For example, FIG. 5 describes a single threshold. However, in some embodiments, more than two thresholds may also be implemented in FIG. 5. Similarly, different embodiments may be employed for assigning a new expiration time to an item. In one non-limiting and non-exhaustive example, if a wait time is greater than a first threshold, then the new expiration time may be set based on a previous wait time plus a constant time value; if the wait time is greater than a second threshold, then the new expiration time may be set based on a multiplicative increase in the wait time. Other variations are also envisaged.

Figure 8:
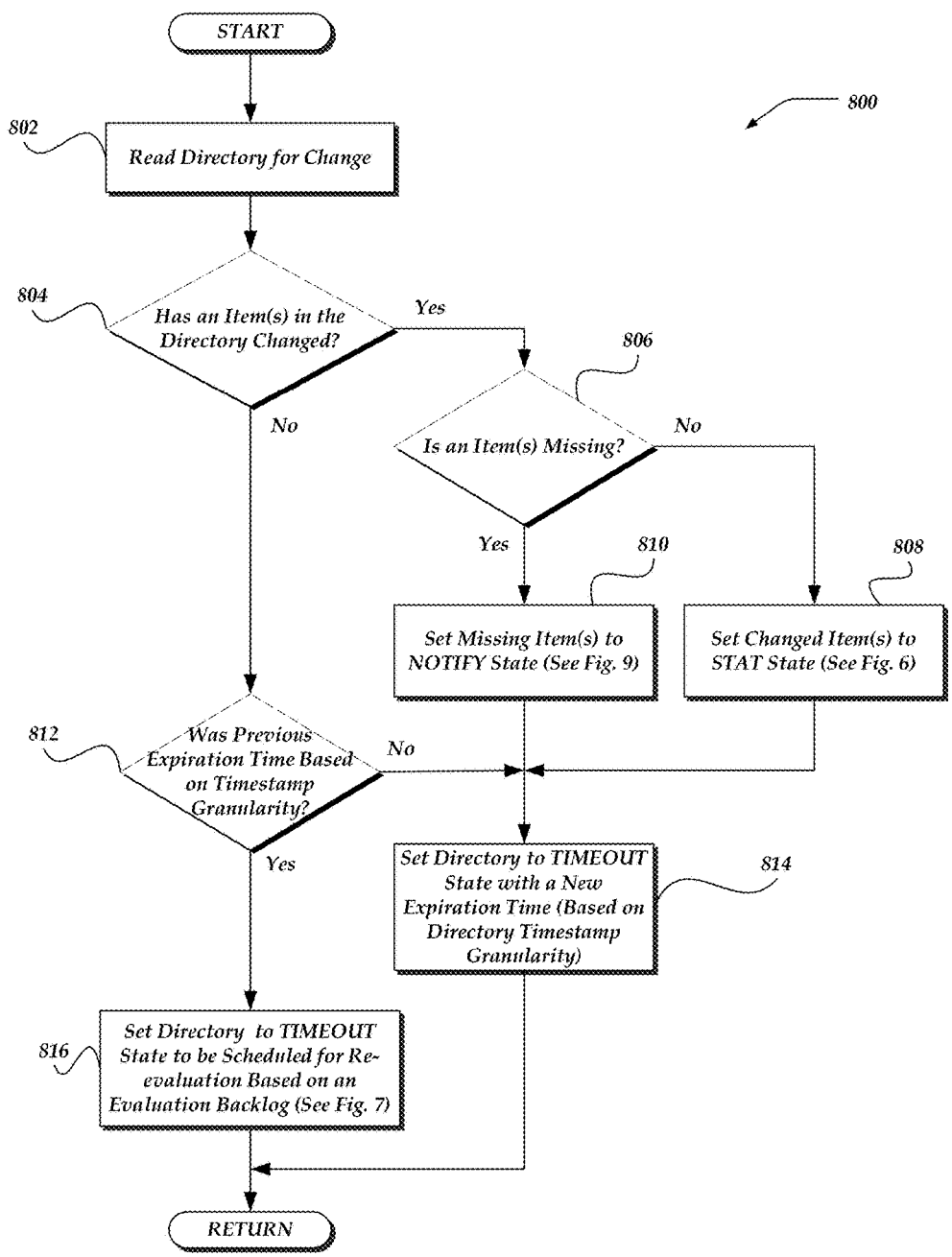
FIG. 8 illustrates a logical flow diagram generally showing one embodiment of a process for processing items in a READ_DIR state.

FIG. 8 illustrates a logical flow diagram generally showing one embodiment of a process for processing items in a READ_DIR state. Process 800 of FIG. 8, in one embodiment, illustrates actions embodied by block 612 of FIG. 6 discussed above.

Process 800 begins, after a start block, at block 802, where a directory is read for a change. In some embodiments, the directory may be read for changes in file names, directory names, and/or other items listed in the directory. Process 800 then continues to decision block 804, where a determination is made whether one or more items in the directory have changed. In one embodiment, a change may be detected by comparing the items listed in the directory to items previously listed in the directory. If an item in the directory has changed, then processing flows to decision block 806; otherwise, processing flows to decision block 812.

At decision block 806, a determination is made whether one or more items are missing in the directory. An item is determined to be missing if it was previously known to be listed in the directory, but subsequently has been removed, deleted, moved, or the like, by a user, a computer application, or the like. In one embodiment, items in the NO_ACTION state may be compared to items listed in the directory to determine if an item is not listed in the directory, but was previously processed. If one or more items are missing, processing flows to block 810; otherwise, processing flows to block 808. In some embodiments, processing may flow to both block 810 and block 808 if one or more items are missing from the directory or one or more other items have changed, but are not missing.

At block 810, an indication of the one or more missing items is identified as being in a NOTIFY state, which is described in more detail below in conjunction with FIG. 9. Briefly, however, at block 810, the indication of the one or more missing items may change to a NO_ACTION state. Processing then flows to block 814.

At block 808, the one or more changed items are identified as being in a STAT state, which is described in more detail above in conjunction with FIG. 6. In some embodiments, if the changed item is a new item, then an indication of the new item may be generated and identified in the STAT state. Processing then flows to block 814.

At decision block 812, a determination is made whether a previous expiration time was based on a timestamp granularity of the directory, such as described above at block 814. If the previous expiration time was based on the timestamp granularity of the directory, then processing flows to block 816; otherwise, processing flows to block 814.

At block 816, the directory is identified as being in a TIMEOUT state to be scheduled for re-evaluation based on an evaluation backlog, as described in more detail above in conjunction with FIG. 7. Process 800 then returns to a calling process to perform other actions.

At block 814, the directory changes to be in a TIMEOUT state with a new expiration time. The new expiration time may be based on the timestamp granularity of the directory. The timestamp granularity may refer to how detailed a directory timestamp may be that indicates a change in the directory. In one non-limiting and non-exhaustive example, a directory may have a timestamp granularity of two seconds. In any event, processing then returns to a calling process to perform other actions.

Figure 9:
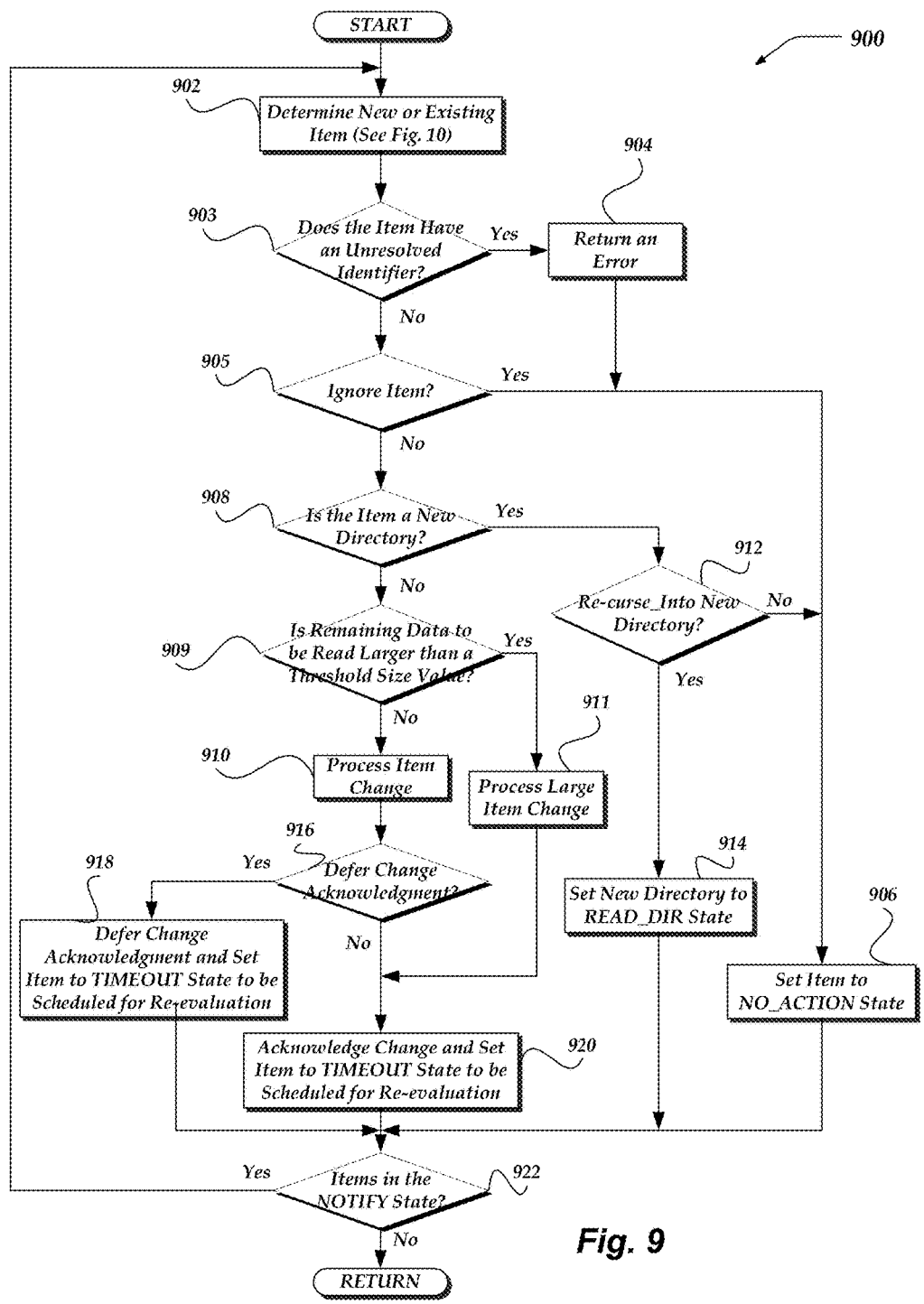
FIG. 9 illustrates a logical flow diagram generally showing one embodiment of a process for processing items in a NOTIFY state.

FIG. 9 illustrates a logical flow diagram generally showing one embodiment of a process for processing items in a NOTIFY state. Process 900 of FIG. 9 may represent, in one embodiment, actions taken at block 614 of FIG. 6.

Process 900 begins, after a start block, at block 902, which is described in more detail below in conjunction with FIG. 10. Briefly, however, at block 902, the item is determined to be a new or existing item.

Proceeding next to decision block 903, a determination is made whether the item has an unresolved identifier. In some embodiments, an unresolved identifier may be returned from the process described at block 902. In some embodiments, metadata associated with the item may include an unresolved identifier. If the item has an unresolved identifier, then processing flows to block 904; otherwise, processing flows to decision block 905. At block 904, an error is returned to a calling process. Processing then flows to block 906.

At decision block 905, a determination is made whether to ignore an item. In some embodiments, a user, system administrator, a computer application, or the like, may indicate than an item is to be ignored. In one non-limiting and non-exhaustive example, items with an item name that ends in ".backup" might be identified as to be ignored. If the item is to be ignored, processing flows to block 906; otherwise, processing flows to decision block 908.

At block 906, the item is identified as being in a NO_ACTION state. Items in the NO_ACTION state may be maintained, but may not change states further. In some embodiments, items in the NO_ACTION state may be utilized to determine if the item was previously processed, such as is described at block 806 of FIG. 8. Processing then flows to decision block 922.

At decision block 908, a determination is made whether the item is a new directory. In one embodiment, a new directory may be a new item that was detected as a change in a directory, such as is described in conjunction with FIG. 8, but more specifically block 808 of FIG. 8. If the item is a new directory, then processing flows to decision block 912; otherwise, processing flows to decision block 909.

At decision block 912, a determination is made whether to recurse into the new directory. In some embodiments, a user, application, or other process, may indicate that a new directory is to be recursed into or not to be recursed into. If the new directory is not to be recursed into, then processing flows to block 906; otherwise, processing flows to block 914. At block 914, the new directory changes to be in a READ_DIR state. Processing then flows to decision block 922.

At decision block 909, a determination is made whether any remaining data to be read in the item is larger than a threshold size value. In some embodiments, the size may refer to a total number of bytes of data that correspond to the item, such as a length of an item in bytes, or some other measure of a count of data may be employed. In one embodiment, the remaining data to be read may include previously unprocessed data in the item. In some embodiments, the threshold size value may be based on an average item size, an arbitrary value, or the like. In one non-limiting example, the threshold size value may be 20 megabytes of unread data. If the remaining data to be read is larger than the threshold size value, then processing flows to block 911; otherwise, processing flows to block 910. At block 911 the large item is processed for a change. In some embodiments, large items are processed in parallel with other items, such as, for example, in a separate thread. Additionally, in some embodiments, processing of large files may include an embodiment of the process described in conjunction with FIG. 9, but without decision block 909 and block 911. Processing next continues to block 920.

At block 910, the item is processed for a change. In some embodiments, the item may be processed to determine if there is an actual change in the item. In one embodiment, processing may include storing a change in the item. In other embodiments, a record may be stored for the item, which may include a plurality of information about an item, such as, but not limited to, an item identifier, an end of file pointer, an end of item identifier, or the like. In yet other embodiments, the change in the item may be employed to troubleshoot errors and/or determine opportunities to improve system performance.

Process 900 then proceeds to decision block 916, where a determination is made whether to defer a change acknowledgment. In one embodiment, an item may include an indication to defer the change acknowledgment for the item, such as a defer change acknowledgment command returned from the process described at block 902. In one embodiment, metadata associated with the item may include the defer change acknowledgment command. If the change acknowledgment is deferred, then processing flows to block 918; otherwise, processing flows to block 920.

At block 918, the item changes to be in a TIMEOUT state to be scheduled for re-evaluation independent of an evaluation backlog. In one embodiment, the item may be assigned a defer expiration time. In some embodiments, the defer expiration time may be based an arbitrary value, such as, but not limited to, greater than zero and less than one second. Additionally, at block 918, a defer change acknowledgment command is returned to a calling process. In one embodiment, metadata associated with the item may include an indication of the defer change acknowledgment command. Processing then flows to decision block 922.

At block 920, the item changes to be in a TIMEOUT state to be scheduled for re-evaluation independent of an evaluation backlog. In one embodiment, the item may be assigned a new expiration time. In some embodiments, the new expiration time may be the same as the defer expiration time. In other embodiments, the new expiration time may be different than the defer expiration time. In any event, the new expiration time may be any suitable value, such as greater than zero and less than one second. In other embodiments, assigning the new expiration time may be similar to that which is described at block 512 of FIG. 5 for assigning a new expiration time. However, the invention is not so limited, and other expiration times may be employed for the new expiration time and/or the defer expiration time. For example, in one embodiment, if there is no change to the contents of the item, then a new expiration time may be assigned based on an evaluation backlog, such as is described above in conjunction with FIG. 7. Additionally, at block 920, a change acknowledgment command is returned to a calling process. In one embodiment, metadata associated with the item may include an indication of the change acknowledgment command. Processing then flows to decision block 922.

At decision block 922, a determination is made whether there are additional items in the NOTIFY state. If there are additional items in the NOTIFY state, then process 900 loops to block 902 to process another item; otherwise, processing returns to a calling process to perform other actions.

Figure 10:
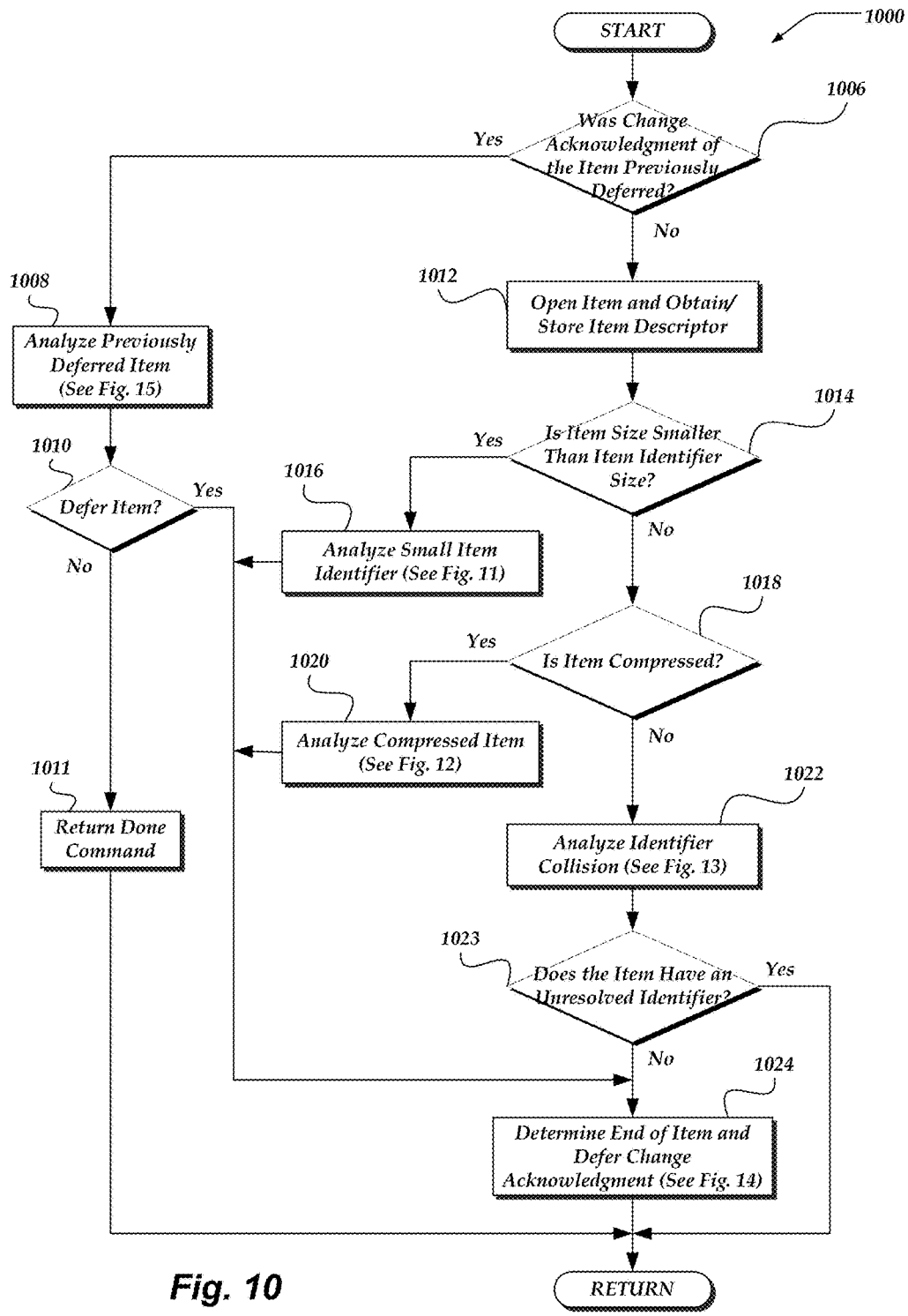
FIG. 10 illustrates a logical flow diagram generally showing one embodiment of an overview process for determining if an item is a new or existing item.

FIG. 10 illustrates a logical flow diagram generally showing one embodiment of an overview process for determining if an item is a new item or is determined to be an existing item. In one embodiment, Process 1000 of FIG. 10 may represent actions taken at block 902 of FIG. 9.

Process 1000 begins, after a start block, at decision block 1006, where a determination is made whether a change acknowledgment of the item was previously deferred. In some embodiments, the change acknowledgment may be deferred if the item was processed for a possible change, but processing was not complete, such as, but not limited to, not reading an item to end of file. In some embodiments, the item may include an attribute that identifies if the change acknowledgment was previously deferred. In one embodiment, metadata associated with the item may include a defer change acknowledgment command. If the change acknowledgment of the item was previously deferred, processing flows to block 1008; otherwise, processing flows to block 1012.

Block 1008 is described in more detail below in conjunction with FIG. 15. Briefly, however, at block 1008, a determination is made whether additional data was written to the previously deferred item. Process 1000 then proceeds to decision block 1010, where a determination is made whether to defer the item. In one embodiment, an item may include an indication to defer the item, such as a defer change acknowledgment command returned from a process described at block 1008. If the item is not deferred, processing flows to block 1011; otherwise, processing flows to block 1024.

At block 1011, a done command is returned to a calling process. In some embodiments, the done command indicates that an item has been completely written to, such that the completely written item can be distinguished from a partially written item. For example, in some embodiments a combination of an end of item heuristics and the done command can distinguish between a partially written item and a completely written item. Processing then returns to a calling process to perform other actions.

At block 1012, the item is opened and an item descriptor is obtained and stored. An item descriptor may be an abstract indicator for accessing an item, such as, but not limited to, an integer, a file handle, or the like. In some embodiments, a cache may store a predefined number of item descriptors, such as, for example, 100 item descriptors may be stored in a cache.

Process 1000 then proceeds to decision block 1014, where a determination is made whether an item size is smaller than an item identifier size. In some embodiments, the item identifier may be based on contents of the item. In one embodiment, the item identifier may be based on a defined amount of data. In another embodiment, the item identifier may be based on a number of bytes of data in the item, such as, but not limited to, a first 256 bytes starting at a beginning of the item. However, the invention is not so limited; rather other item identifier sizes may be employed without departing from the scope or spirit of the invention. If the item size is smaller than the item identifier size, then processing flows to block 1016; otherwise, processing flows to decision block 1018. Block 1016 is described in more detail below in conjunction with FIG. 11. Briefly, however, at block 1016, a small item identifier is analyzed to detect if the item is a new or existing item. Processing then flows to block 1024.

At decision block 1018, a determination is made whether the item is compressed using a data compression algorithm. In some embodiments, compression may be determined by an item-type extension in a name of the item (e.g. ".gz"). If the item is compressed, processing flows to block 1020; otherwise, processing flows to block 1022.

Block 1020 is described in more detail below in conjunction with FIG. 12. Briefly, however, at block 1020, the compressed item is analyzed to detect if item is a new or existing item. Processing then flows to block 1024.

Block 1022 is described in more detail below in conjunction with FIG. 13. Briefly, however, at block 1022, an identifier collision is analyzed to detect if the item is a new or existing item. Proceeding next to decision block 1023, a determination is made whether the item has an unresolved identifier. In some embodiments, an unresolved identifier may be returned from the process described at block 1022. If the item does not have an unresolved identifier, then processing flows to block 1024; otherwise, processing returns to a calling process to perform other actions.

Block 1024 is described in more detail below in conjunction with FIG. 14. Briefly, however, at block 1024, an end of the item is determined and a defer change acknowledgment command is returned. Processing then returns to a calling process to perform other actions.

Figure 11:
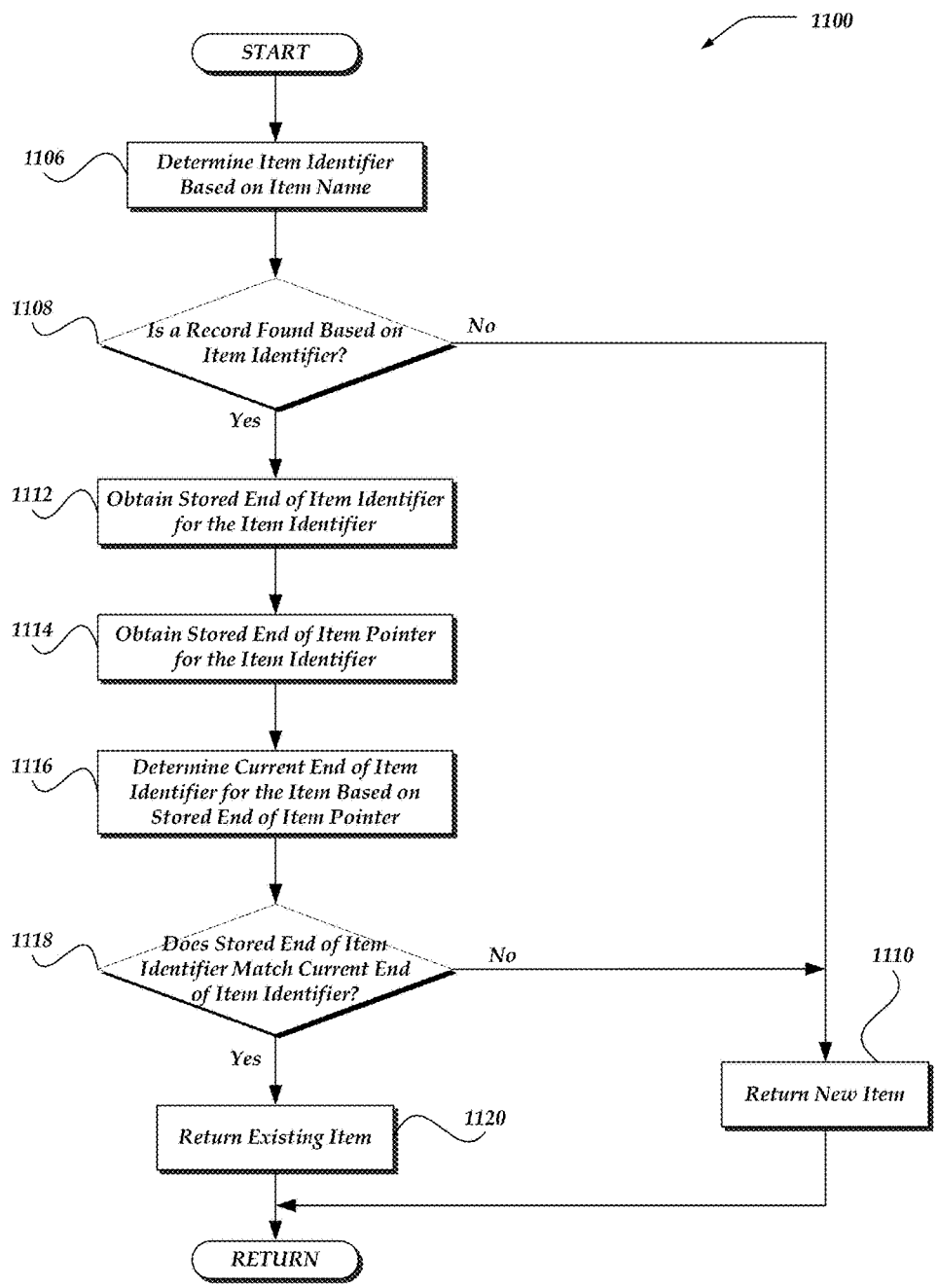
FIG. 11 illustrates a logical flow diagram generally showing one embodiment of a process for determining if an item is new or existing depending on its size.

FIG. 11 illustrates a logical flow diagram generally showing one embodiment of a process for determining if an item is new or existing depending on its size. In one embodiment, process 1100 of FIG. 11 represents actions that may be taken at block 1016 of FIG. 10.

Process 1100 begins, after a start block, at block 1106, where an item identifier is determined based on a name of a current item. The item name may refer to an alphanumeric label corresponding to an item. In some embodiments, the item name may include one or more item-type extensions, such as ".doc", ".txt", ".log", ".gz", or the like. In one embodiment, the item identifier may be a cyclic redundancy check (CRC) checksum of the item name. However, the invention is not so limited; and, the item identifier may employ other unique identifiers derived from the item name.

Processing continues to decision block 1108, where a determination is made whether a record is found based on the item identifier. In one embodiment, a record of historical data is maintained for each of a plurality of previously processed items. In one embodiment, a previously processed item is an item that was previously reviewed. In some embodiments, the record may include a plurality of information about an item, such as, but not limited to, the item identifier, an end of file pointer, an end of item identifier, or the like. If a record is not found, then processing flows to block 1110; otherwise, processing flows to block 1112.

At block 1110, the item is recognized as a new item and is returned to a calling process to be processed as a new item. Processing then returns to a calling process to perform other actions.

At block 1112, a stored end of item identifier is obtained from the record for the item identifier. The stored end of item identifier may be an end of item identifier that was stored for the item during previous processing of the item. Moreover, the end of item identifier may be a unique identifier that is based on content of the item. In one embodiment, the end of item identifier may be a CRC checksum of a last 256 bytes of the content of the item. In other embodiments, other suitable numbers of bytes may be utilized to generate an end of item identifier. In one embodiment, the number of bytes utilized to generate the end of item identifier may correspond to an item size. Similarly, the invention is not limited to a CRC checksum; rather, the item identifier may employ other unique identifiers derived from the content of the item without departing from the scope or spirit of the invention.

Process 1100 then proceeds to block 1114, where a stored end of item pointer is obtained from the record for the item identifier. The stored end of item pointer may be a reference to an end of the item that was stored during previous processing of the item. In one embodiment, the stored end of item pointer may be a reference to a last byte of the previously process item. For example, the last byte may be the last byte that was previously read from the item.

Processing continues at block 1116, where a current end of item identifier is determined for the item based on the stored end of item pointer. The current end of item identifier may be an end of item identifier for a current item that is based on a predetermined amount of content preceding the stored end of item pointer of the current item. In one embodiment, the predetermined amount of content may be 256 bytes of data. In another embodiment, the current end of item identifier may be a CRC checksum of up to the predetermined amount of data of the current item that precedes the stored end of item pointer. Thus, a number of bytes utilized to generate the current end of file identifier may be equal to the number of bytes utilized to generate the stored end of item identifier. For example, assume that the stored end of file pointer is 180 bytes and that the stored end of item identifier was based on the 180 byes. If a current item size is 200 bytes, then the current end of item identifier may be a CRC checksum of the bytes preceding byte 180 of the current item.

Processing then flows to decision block 1118 where a determination is made whether the stored end of item identifier matches the current end of item identifier. In one embodiment, a match may be determined if the CRC checksum of the stored end of item identifier is equal to the CRC checksum of the current end of item identifier. If the stored end of item identifier matches the current end of item identifier, then processing flows to block 1120; otherwise, processing flows to block 1110.

At block 1120, the item is recognized as an existing item and is returned to a calling process to be processed as an existing item. Processing then returns to a calling process to perform other actions.

Figure 12:
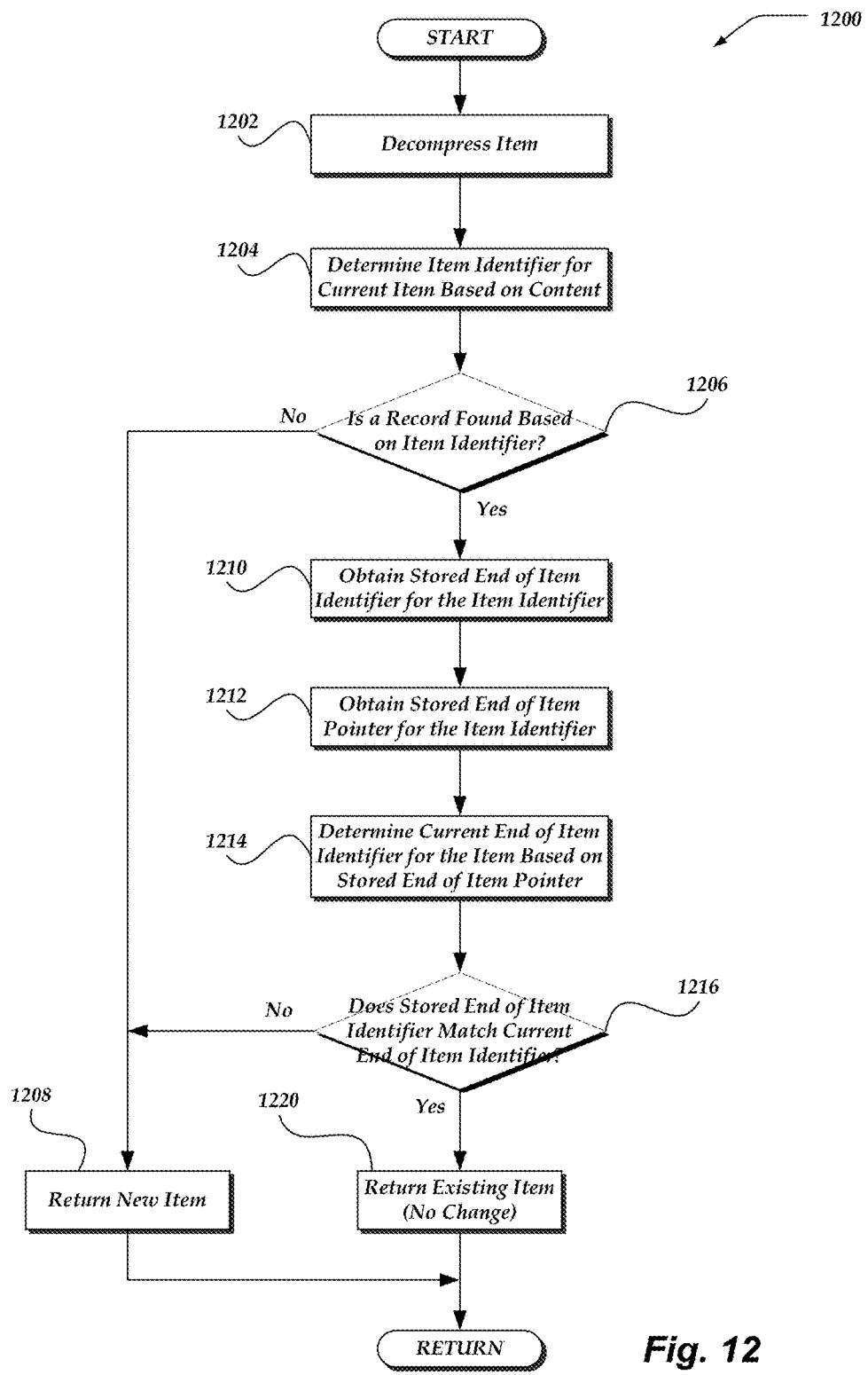
FIG. 12 illustrates a logical flow diagram generally showing one embodiment of a process for determining if an item is new or existing depending on if the item was compressed.

FIG. 12 illustrates a logical flow diagram generally showing one embodiment of a process for determining if an item is new or existing depending on if the item was compressed. Process 1200 of FIG. 12 may, in one embodiment, represent actions taken at block 1020 of FIG. 10.

Process 1200 begins, after a start block, at block 1202, where the item is decompressed. Decompression may include any suitable data decompression algorithm that corresponds to the algorithm utilized to compress the item. In one embodiment, a predetermined amount of content of the item may be decompressed to determine and/or generate an item identifier. Process 1200 then proceeds to block 1204, where an item identifier is determined for the item based on a predetermined amount of content of the item. In one embodiment, the item identifier may be a CRC checksum of a first 256 bytes of the item. In other embodiments, other suitable numbers of bytes may be utilized to generate the item identifier. Similarly, other unique identifiers derived from the content of the item may be employed without departing from the scope or spirit of the invention.

Processing continues at decision block 1206, where a determination is made whether a record is found based on the item identifier. Determining whether a record is found may be performed similar to that which is described at block 1108 of FIG. 11 for determining whether a record is found. In any event, if a record is not found then processing flows to block 1208; otherwise, processing flows to block 1210.

At block 1208, the item is recognized as a new item and is returned to a calling process to be processed as a new item. In some embodiments, processing the new item may include re-decompressing the item. Processing then returns to a calling process to perform other actions.

At block 1210, a stored end of item identifier is obtained from the record for the item identifier. Obtaining the stored end of item identifier may be similar to that which is described at block 1112 of FIG. 11 for obtaining the stored end of item identifier. Process 1200 then continues to block 1212, where a stored end of item pointer is obtained from the record for the item identifier. Obtaining the stored end of item pointer may be performed similar to that which is described at block 1114 of FIG. 11 for obtaining the stored end of item pointer.

Processing continues at block 1214, where a current end of item identifier is determined for the item based on the stored end of item pointer. In some embodiments, the item may be decompressed up to the stored end of item pointer. Determining the current end of item identifier may be similar to that which is described at block 1116 of FIG. 11 for determining the current end of item identifier. In one embodiment, the current end of item identifier may be determined utilizing different content of the item than the content utilized to generate the item identifier at block 1204.

Process 1200 then flows to decision block 1216, where a determination is made whether the stored end of item identifier matches the current end of item identifier. Determining whether the current end of item identifier matches the stored end of item identifier may be similar to that which is described at block 1118 of FIG. 11 for determining whether the current end of item identifier matches the stored end of item identifier. If the stored end of item identifier matches the current end of item identifier, then processing flows to block 1220; otherwise, processing flows to block 1208.

At block 1220, the item is recognized as an existing item and is returned to a calling process to be processed as an existing item. Processing then returns to a calling process to perform other actions.

Figure 13:
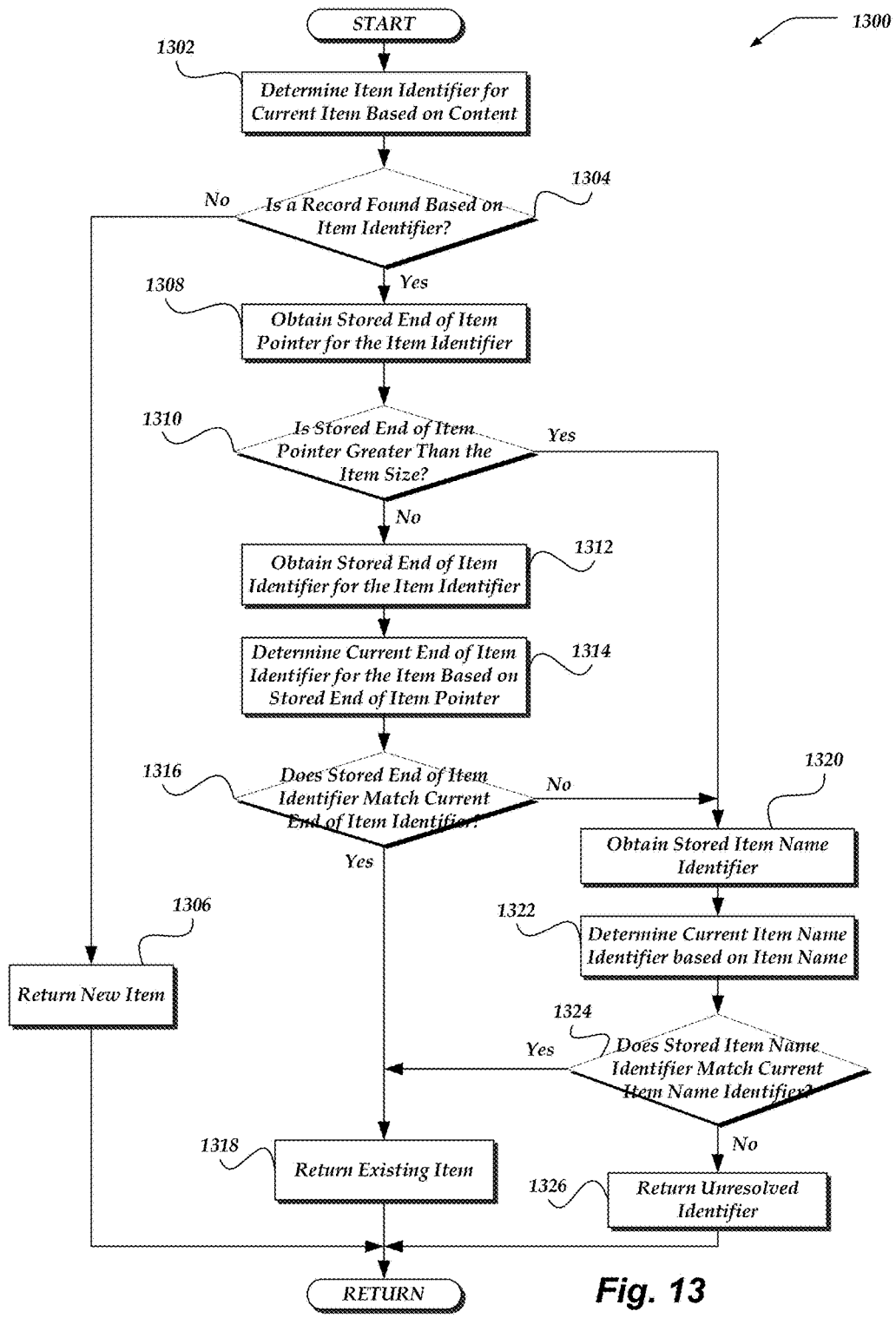
FIG. 13 illustrates a logical flow diagram generally showing one embodiment of a process for determining if an item is new or existing depending on an identifier collision.

FIG. 13 illustrates a logical flow diagram generally showing one embodiment of a process for determining if an item is new or existing depending on an identifier collision. An identifier collision may occur if two or more different items have a same item identifier. Process 1300 of FIG. 13 may represent one embodiment of actions taken at block 1022 of FIG. 10.

Process 1300 begins, after a start block, at block 1302, where an item identifier is determined for the current item based on content of the current item. Determining an item identifier may be performed similar to that which is described at block 1202 of FIG. 12 for determining an item identifier.

Processing continues at decision block 1304, where a determination is made whether a record is found based on the item identifier. Determining whether a record is found may be similar to that which is described at block 1108 of FIG. 11 for determining whether a record is found. If a record is not found, then processing flows to block 1306; otherwise, processing flows to block 1308. At block 1306, the item is recognized as a new item and is returned to a calling process to be processed as a new item. Processing then returns to a calling process to perform other actions.

At block 1308, a stored end of item pointer is obtained from the record for the item identifier. Obtaining the stored end of item pointer may be similar to that which is described at block 1114 of FIG. 11 for obtaining the stored end of item pointer.

Continuing to decision block 1310, a determination is made whether the stored end of item pointer is greater than the item size. If the stored end of item pointer is greater than the item size, processing flows to block 1320; otherwise, processing flows to block 1312. At block 1320, a stored item name identifier is obtained from the record based on the item identifier. The stored item name identifier may be an item name identifier that was stored for the item during previous processing of the item. Moreover, the item name identifier may be a unique identifier that is based on a name of the item. In one embodiment, the item name identifier may be a cyclic redundancy check (CRC) checksum of the item name. However, the invention is not so limited; rather, the item name identifier may employ other unique identifiers derived from the item name without departing from the scope or spirit of the invention.

Processing then flows to block 1322, where a current item name identifier is determined based on the item name of the current item. In one embodiment, the current item name identifier may be a cyclic redundancy check (CRC) checksum of the item name of the current item. Process 1300 then proceeds to decision block 1324, where a determination is made whether the stored item name identifier matches the current item name identifier. In one embodiment, a match may be determined if the CRC checksum of the stored end of item identifier is equal to the CRC checksum of the current end of item identifier. If the stored item name identifier does not match the current item name identifier, then processing flows to block 1326; otherwise, processing flows to block 1318.

At block 1326, an unresolved identifier is returned to a calling process to indicate that the current item is indeterminable as a new item or an existing item. In some embodiments, the unresolved identifier may be included in metadata associated with the item. Processing then returns to a calling process to perform other actions.

At block 1312, a stored end of item identifier is obtained from the record for the item identifier. Obtaining the stored end of item identifier may be similar to that which is described at block 1112 of FIG. 11 for obtaining the stored end of item identifier.

Process 1300 then continues to block 1314, where a current end of item identifier is determined for the item based on the stored end of item pointer. Determining the current end of item identifier may be similar to that which is described at block 1116 of FIG. 11 for determining the current end of item identifier. In one embodiment, the current end of item identifier may be determined utilizing different content of the item than the content utilized to generate the item identifier at block 1204.

Process 1300 then flows to decision block 1316, where a determination is made whether the stored end of item identifier matches the current end of item identifier. Determining whether the current end of item identifier matches the stored end of item identifier may be similar to that which is described at block 1118 of FIG. 11 for determining whether the current end of item identifier matches the stored end of item identifier. If the stored end of item identifier matches the current end of item identifier, then processing flows to block 1318; otherwise, processing flows to block 1320.

At block 1318, the item is recognized as an existing item and is returned to a calling process to be processed as an existing item. Processing then returns to a calling process to perform other actions.

Figure 14:
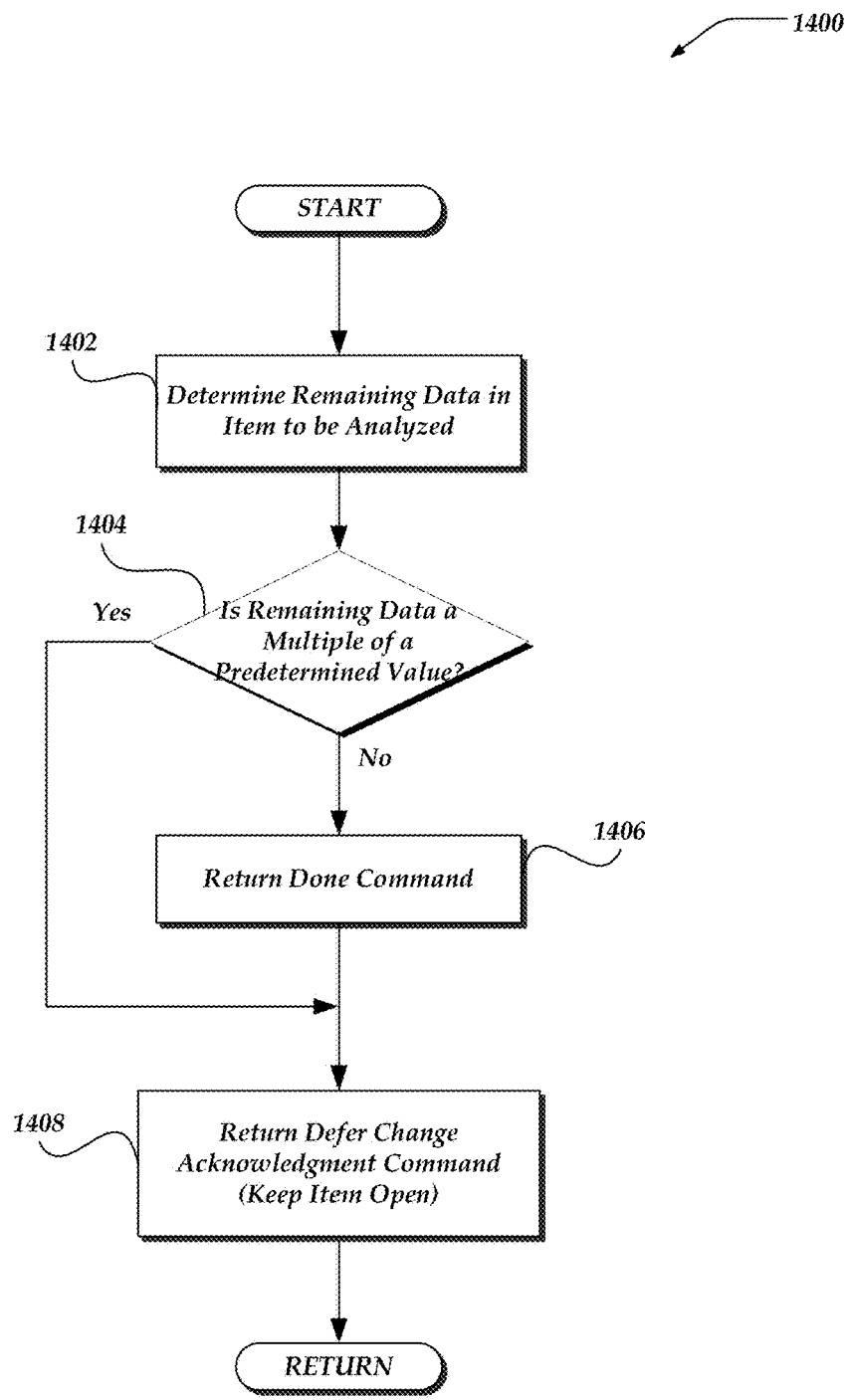
FIG. 14 illustrates a logical flow diagram generally showing one embodiment of a process for determining if a new or existing item is to be deferred.

FIG. 14 illustrates a logical flow diagram generally showing one embodiment of a process for determining if a new or existing item is to be deferred depending on an end of item. Process 1400 of FIG. 14 may, in one embodiment, represent actions taken during block 1024 of FIG. 10.

Process 1400 begins, after a start block, at block 1402, where a determination is made as to remaining data in an item to be analyzed. In one embodiment, determining the remaining data may be based on a comparison of an amount of data previously processed and a current item size.

Process 1400 then proceeds to decision block 1404, where a determination is made whether the remaining data is a multiple of a predetermined value. In some embodiments, remaining data that is a multiple of a predetermined value may indicate that the item is being written from an operating system that buffers data. Thus, in one embodiment, the predetermined value may be based on a size of an operating system buffer. In one non-limiting and non-exhaustive example, the predetermined value may be 512 bytes. If the end of item is a multiple of a predetermined value, processing flows to block 1408; otherwise, processing flows to block 1406.

At block 1406, a done command is returned to a calling process. In some embodiments, the done command indicates that an item has been completely written to, such that the completely written item can be distinguished from a partially written item.

Processing continues next at block 1408, where a defer change acknowledgment command is returned to a calling process. In some embodiments, the defer change acknowledgment command may be a tag, pointer, or other indicator that corresponds to the item. In one embodiment, metadata associated with the item may include the defer change acknowledgment command. In some embodiments, the item is kept open for additional processing. Processing then returns to a calling process to perform other actions.

Figure 15:
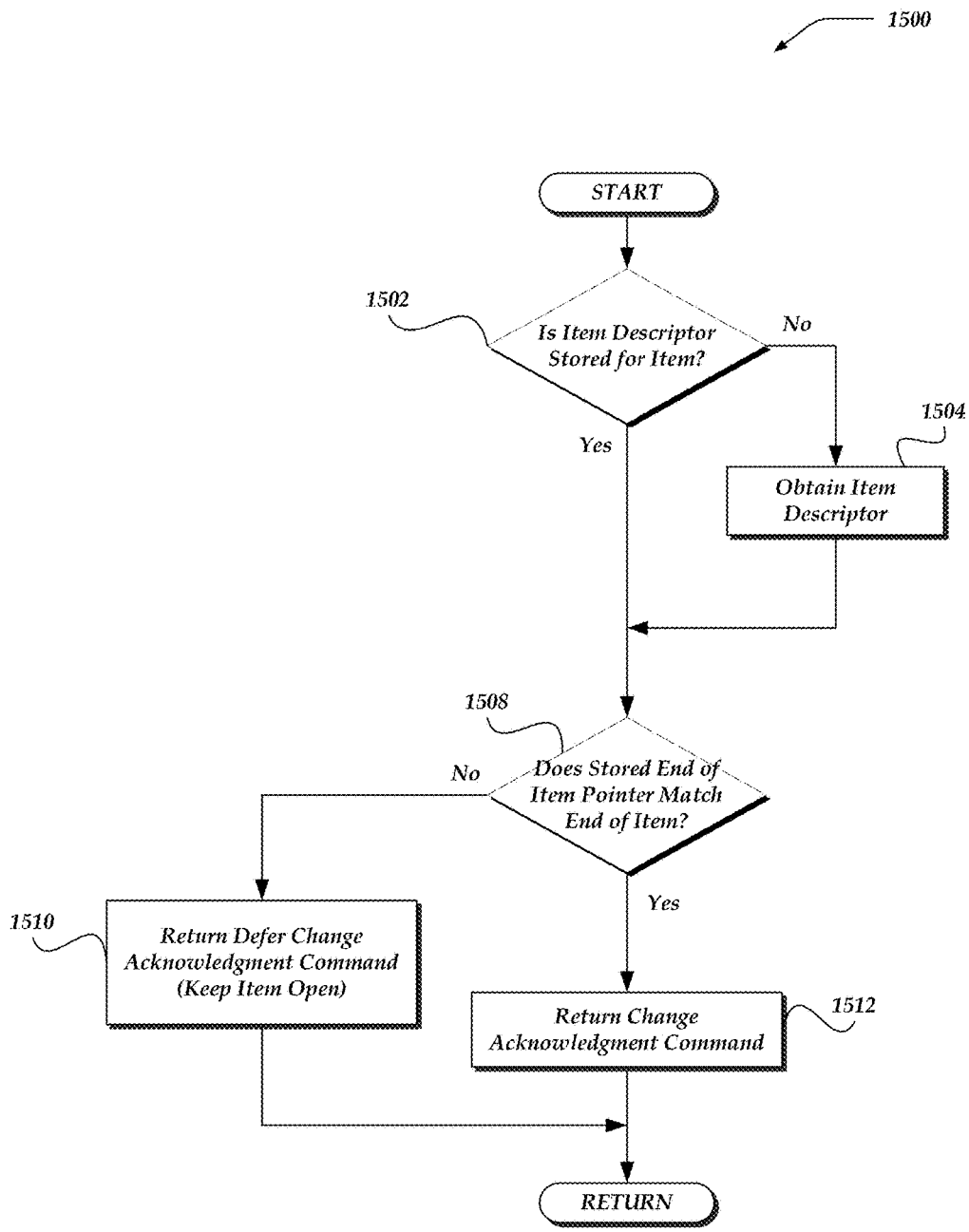
FIG. 15 illustrates a logical flow diagram generally showing one embodiment of a process for determining if additional data was written a previously deferred item.

FIG. 15 illustrates a logical flow diagram generally showing one embodiment of a process for processing a previously deferred item. Process 1500 of FIG. 15 begins, after a start block, at decision block 1502, where a determination is made whether an item descriptor is stored for a current item. An item descriptor may have been stored when the item was previously processed, such as at block 1012 of FIG. 10. If the item descriptor is not stored for the item, then processing flows to block 1504; otherwise, processing flows to decision block 1508. At block 1504 the item descriptor for the item is obtained, such as from an operating system, or other source.

Processing then flows to decision block 1508 where a determination is made whether a stored end of item pointer for the current item matches the end of item for the current item. The stored end of item pointer may be a reference to an end of the item that was stored during previous processing of the item. In some embodiments, the stored end of item pointer may be stored in a cache. In other embodiments, the stored end of item pointer may be included in metadata associated with the item. Moreover, in some embodiments, the end of item for the current item may be a current item size. In other embodiments, the end of item for the current item may be obtained by processing the item, such as by reading the item, to an end of the item. If the stored end of item pointer does not match the end of item, then processing flows to block 1510; otherwise, processing flows to block 1512.

At block 1510, a defer change acknowledgment command is returned to a calling process. Returning a defer change acknowledgment command may be similar to that which is described at block 1408 of FIG. 14 for returning a defer change acknowledgment command. Processing then returns to a calling process to perform other actions.

If the stored end of item pointer matches the end of item, then processing flows to block 1512. At block 1512, a change acknowledgment command is returned to a calling process. Processing then returns to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
observing a plurality of files in at least a portion of a filesystem for newly added files and changes to existing files;
upon detecting a new file in the at least the portion of the filesystem:
creating a record for the new file;
processing data in the new file; and
setting a time period for the new file that indicates when the observing step is to evaluate whether changes have been made to the new file;
upon detecting a change to an existing file in the at least the portion of the filesystem:
determining if a current size of the existing file is different than a previously saved size for the existing file;
based on determining that the current size of the existing file is different than the previously saved size:
identifying new data in the existing file by comparing a previous end of item identifier associated with the existing file with a current end of item identifier of the existing file, the current end of item identifier is calculated using a number of bytes from the end of the existing file; and
processing the new data in the existing file; and
setting a time period for the existing file that indicates when the observing step is to reevaluate whether changes have been made to the existing file.

2. The method as recited in claim 1, wherein setting the time period to reevaluate the existing file for new updates further comprises:
determining a frequency of updates for the existing file;
setting the time period based on the frequency of updates.

3. The method as recited in claim 1, wherein setting the time period to reevaluate the existing file for new updates further comprises:
determining a frequency of updates for the existing file;
setting the time period based on the frequency of updates, wherein the time period is set to a small value when the frequency of updates is high, and wherein the time period is set to a large value when the frequency of updates is low.

4. The method as recited in claim 1, wherein setting the time period to evaluate the new file for updates further comprises:
setting the time period to evaluate the new file for updates to a default initial value.

5. The method as recited in claim 1, wherein observing the plurality of files in at least the portion of the filesystem includes checking the existing file for changes upon the existing file having a time period to reevaluate the existing file that has lapsed.

6. The method as recited in claim 1, wherein upon detecting a change to an existing file in the at least the portion of the filesystem includes detecting a change in at least a portion of a directory listing.

7. The method as recited in claim 1, wherein setting the time period to reevaluate the existing file for new updates further comprises:
determining a frequency of updates for the existing file;
extending the time period based on a low frequency of updates.

8. An apparatus, comprising:
a file observation subsystem, implemented at least partially in hardware, that observes a plurality of files in at least a portion of a filesystem for newly added files and changes to existing files;
wherein the file observation subsystem, upon detecting a new file in the at least the portion of the filesystem:
creates a record for the new file;
processes data in the new file; and
sets a time period for the new file that indicates when the file observation subsystem is to evaluate whether changes have been made to the new file;
a file processor subsystem, implemented at least partially in hardware, that, upon the file observation subsystem detecting a change to an existing file in the at least the portion of the filesystem:
determines if a current size of the existing file is different than a previously saved size for the existing file;
based on a determination that the current size of the existing file is different than the previously saved size, identifies new data in the existing file by comparing a previous end of item identifier associated with the existing file with a current end of item identifier of the existing file, and processes the new data in the existing file, the current end of item identifier is calculated using a number of bytes from the end of the existing file; and
sets a time period for the existing file that indicates when the file observation subsystem is to reevaluate whether changes have been made to the existing file.

9. The apparatus as recited in claim 8, wherein sets the time period to reevaluate the existing file for new updates further comprises:
determines a frequency of updates for the existing file;
sets the time period based on the frequency of updates.

10. The apparatus as recited in claim 8, wherein sets the time period to reevaluate the existing file for new updates further comprises:
determines a frequency of updates for the existing file;
sets the time period based on the frequency of updates, wherein the time period is set to a small value when the frequency of updates is high, and wherein the time period is set to a large value when the frequency of updates is low.

11. The apparatus as recited in claim 8, wherein sets the time period to evaluate the new file for updates further comprises:
sets the time period to evaluate the new file for updates to a default initial value.

12. The apparatus as recited in claim 8, wherein the file observation subsystem checks the existing file for changes upon the existing file having a time period to reevaluate the existing file that has lapsed.

13. The apparatus as recited in claim 8, wherein the file observation subsystem detects a change in at least a portion of a directory listing.

14. The apparatus as recited in claim 8, wherein sets the time period to reevaluate the existing file for new updates further comprises:
determines a frequency of updates for the existing file;
extends the time period based on a low frequency of updates.

15. A non-transitory computer readable medium, storing software instructions, which when executed by one or more processors cause performance of:
observing a plurality of files in at least a portion of a filesystem for newly added files and changes to existing files;
upon detecting a new file in the at least the portion of the filesystem:
creating a record for the new file;
processing data in the new file; and
setting a time period for the new file that indicates when the observing step is to evaluate whether changes have been made to the new file;
upon detecting a change to an existing file in the at least the portion of the filesystem:
determining if a current size of the existing file is different than a previously saved size for the existing file;
based on determining that the current size of the existing file is different than the previously saved size:
identifying new data in the existing file by comparing a previous end of item identifier associated with the existing file with a current end of item identifier of the existing file, the current end of item identifier is calculated using a number of bytes from the end of the existing file; and
processing the new data in the existing file; and
setting a time period for the existing file that indicates when the observing step is to reevaluate whether changes have been made to the existing file.

16. The non-transitory computer readable medium as recited in claim 15, wherein setting the time period to reevaluate the existing file for new updates further comprises:
determining a frequency of updates for the existing file;
setting the time period based on the frequency of updates.

17. The non-transitory computer readable medium as recited in claim 15, wherein setting the time period to reevaluate the existing file for new updates further comprises:
determining a frequency of updates for the existing file;
setting the time period based on the frequency of updates, wherein the time period is set to a small value when the frequency of updates is high, and wherein the time period is set to a large value when the frequency of updates is low.

18. The non-transitory computer readable medium as recited in claim 15, wherein setting the time period to evaluate the new file for updates further comprises:
setting the time period to evaluate the new file for updates to a default initial value.

19. The non-transitory computer readable medium as recited in claim 15, wherein observing the plurality of files in at least the portion of the filesystem includes checking the existing file for changes upon the existing file having a time period to reevaluate the existing file that has lapsed.

20. The non-transitory computer readable medium as recited in claim 15, wherein upon detecting a change to an existing file in the at least the portion of the filesystem includes detecting a change in at least a portion of a directory listing.

21. The non-transitory computer readable medium as recited in claim 15, wherein setting the time period to reevaluate the existing file for new updates further comprises:
   determining a frequency of updates for the existing file;
   extending the time period based on a low frequency of updates.

* * * * *